United States Patent
Bonner

(10) Patent No.: US 12,226,861 B1
(45) Date of Patent: Feb. 18, 2025

(54) CONSTANT RAKE FLUTED DRILL BIT AND METHOD OF MANUFACTURE

(71) Applicant: Jeffrey Bonner, Naples, FL (US)

(72) Inventor: Jeffrey Bonner, Naples, FL (US)

( * ) Notice: Subject to any disclaimer, the term of this patent is extended or adjusted under 35 U.S.C. 154(b) by 0 days.

(21) Appl. No.: 18/581,321

(22) Filed: Feb. 19, 2024

Related U.S. Application Data

(60) Provisional application No. 63/447,623, filed on Feb. 22, 2023.

(51) Int. Cl.
| | | |
|---|---|---|
| *B23P 15/32* | (2006.01) | |
| *B21K 5/04* | (2006.01) | |
| *B23C 3/32* | (2006.01) | |
| *B24B 19/04* | (2006.01) | |
| *B23B 3/26* | (2006.01) | |
| *B23B 3/30* | (2006.01) | |
| *B23B 5/48* | (2006.01) | |
| *B23B 25/06* | (2006.01) | |

(52) U.S. Cl.
CPC ............... *B23P 15/32* (2013.01); *B21K 5/04* (2013.01); *B23C 3/32* (2013.01); *B24B 19/04* (2013.01); *B23B 3/26* (2013.01); *B23B 3/30* (2013.01); *B23B 5/48* (2013.01); *B23B 25/06* (2013.01); *B23B 2220/12* (2013.01); *B23B 2228/24* (2013.01); *B23B 2260/0482* (2013.01)

(58) Field of Classification Search
CPC .. B23P 15/32; B21K 5/02; B21K 5/04; B21K 5/10; B23C 3/32; B24B 19/04
USPC .............................................. 76/108.1–108.6
See application file for complete search history.

(56) References Cited

U.S. PATENT DOCUMENTS

| | | | | |
|---|---|---|---|---|
| 3,848,483 A | * | 11/1974 | Wall .......................... | B23C 3/32 76/108.6 |
| 4,068,414 A | * | 1/1978 | Breitenstein ............ | B24B 19/04 451/48 |
| 4,679,971 A | * | 7/1987 | Maier ..................... | B23P 15/32 408/230 |
| 4,976,325 A | * | 12/1990 | Garbarino ............... | B23P 15/32 175/420.1 |
| 4,999,952 A | * | 3/1991 | Speiser ................... | B24B 19/04 451/48 |

(Continued)

FOREIGN PATENT DOCUMENTS

| | | | | |
|---|---|---|---|---|
| CA | 2460855 C | | 6/2008 | |
| DE | 3623175 A1 | * | 1/1988 | ............. B24B 19/04 |

(Continued)

*Primary Examiner* — Jason Daniel Prone
(74) *Attorney, Agent, or Firm* — Allen D Hertz, P. A.; Allen D. Hertz

(57) ABSTRACT

A constant rake planar cutting edge fluted drill bit and a method of manufacturing the same. The drill bit includes a planar cutting face formed at the tip end of the bit by a motion of a rotating machining wheel respective to a stationary blank in a first step. Once the cutting face is formed, the blank is rotated and translated in a direction parallel to an elongated axis, during which the rotating machining wheel creates a flute. Upon completion of the first flute, the bit is rotated accordingly and the processes are repeated to create each subsequent planar cutting face and respective flute. The process can also be completed in a slightly modified version of a reverse process, fabricating a flute prior to formation of the planar cutting face of the bit.

24 Claims, 29 Drawing Sheets

(56) References Cited

U.S. PATENT DOCUMENTS

| | | | | |
|---|---|---|---|---|
| 5,065,549 A * | 11/1991 | Speiser | ................... | B24B 19/04 |
| | | | | 451/48 |
| 6,126,521 A * | 10/2000 | Shearer | ................... | B23P 15/32 |
| | | | | 451/48 |
| 6,419,561 B1 * | 7/2002 | George | ................... | B24B 19/04 |
| | | | | 451/48 |
| 6,431,962 B1 * | 8/2002 | George | ................... | B24B 19/04 |
| | | | | 451/548 |
| 6,602,029 B1 * | 8/2003 | George | ................... | B24B 19/04 |
| | | | | 407/53 |
| 7,201,543 B2 * | 4/2007 | Muhlfriedel | ............ | B24B 19/04 |
| | | | | 408/230 |
| 7,779,542 B2 * | 8/2010 | Aloise | ................... | B24B 19/04 |
| | | | | 148/563 |
| 7,892,235 B2 | 2/2011 | Ellis | | |
| 8,286,536 B2 * | 10/2012 | Kirby | ................... | B24B 19/04 |
| | | | | 82/1.11 |
| 9,199,315 B2 * | 12/2015 | Mühlfriedel | ............ | B24B 19/04 |
| 9,656,331 B2 * | 5/2017 | Mehrotra | ................ | B24B 19/04 |
| 9,839,984 B2 * | 12/2017 | Burns | ................... | B24B 19/04 |
| 10,252,321 B2 * | 4/2019 | Achleitner | ............... | B21H 3/10 |
| 10,335,167 B2 | 7/2019 | Ellis | | |
| 2002/0159849 A1 * | 10/2002 | Longden | ................. | B24B 19/04 |
| | | | | 76/108.6 |
| 2003/0060133 A1 * | 3/2003 | Junker | ................... | B24B 19/04 |
| | | | | 451/28 |
| 2011/0097976 A1 * | 4/2011 | Muhlfriedel | ............ | B24B 19/04 |
| | | | | 451/48 |
| 2011/0170973 A1 * | 7/2011 | Von Puttkamer | ....... | B24B 19/04 |
| | | | | 451/48 |
| 2013/0118313 A1 * | 5/2013 | Mehrotra | ................. | B23C 3/32 |
| | | | | 451/48 |
| 2015/0290724 A1 * | 10/2015 | Sharivker | ................ | B21K 5/04 |
| | | | | 451/48 |
| 2015/0360302 A1 * | 12/2015 | Guter | ..................... | B23B 51/02 |
| | | | | 76/108.6 |

FOREIGN PATENT DOCUMENTS

| | | | | |
|---|---|---|---|---|
| EP | 1632301 B1 | 11/2009 | | |
| FR | 1552862 A * | 1/1969 | ............ | B24B 19/04 |
| GB | 609964 A * | 10/1948 | ............ | B24B 19/04 |
| GB | 623734 A * | 5/1949 | ............ | B24B 19/04 |
| WO | WO-2007097013 A1 * | 8/2007 | ............ | B24B 19/04 |
| WO | WO2012068641 A1 | 5/2012 | | |

\* cited by examiner

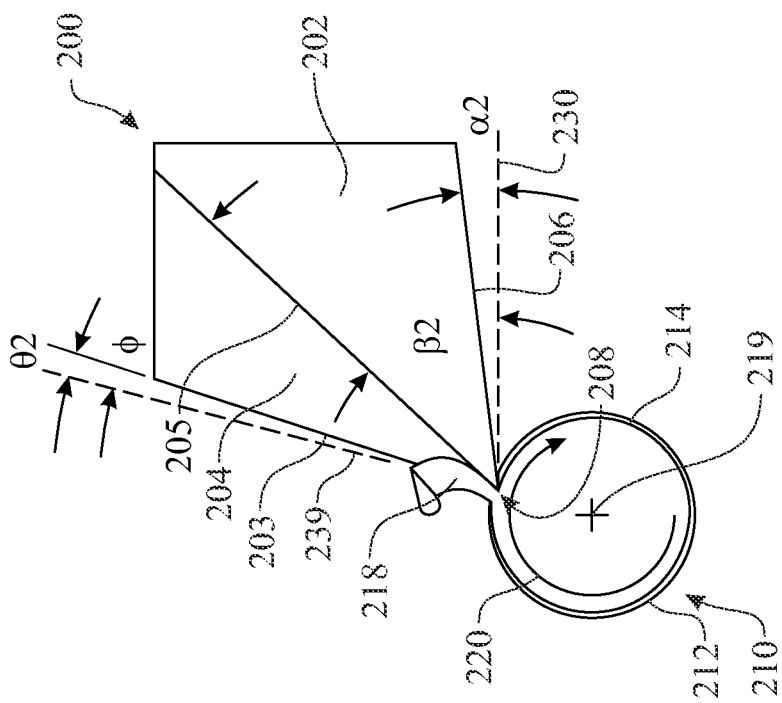
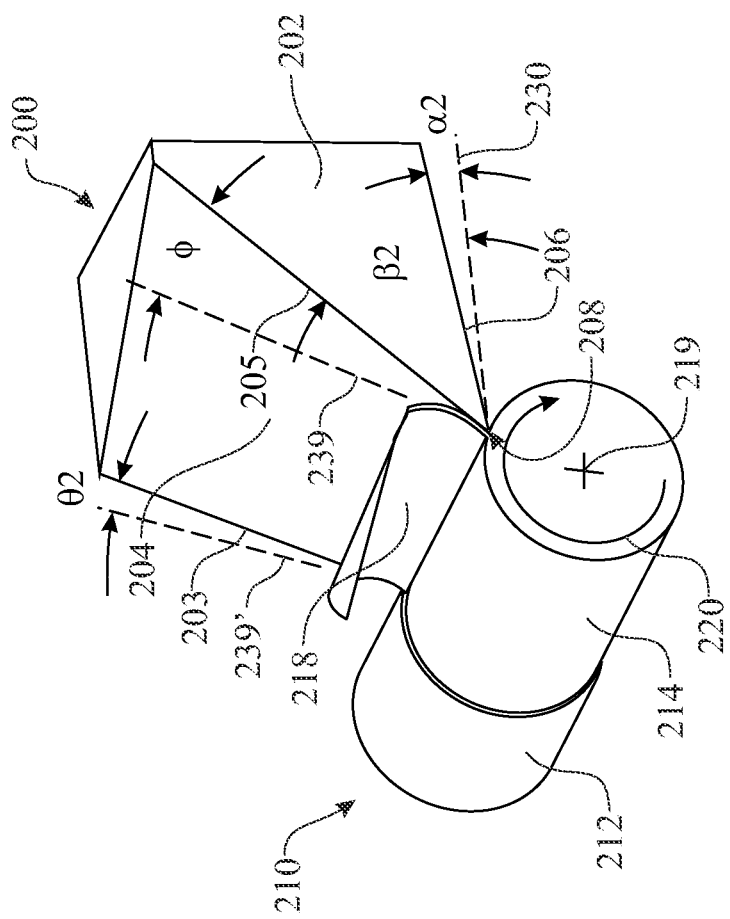
FIG. 2A
FIG. 2B

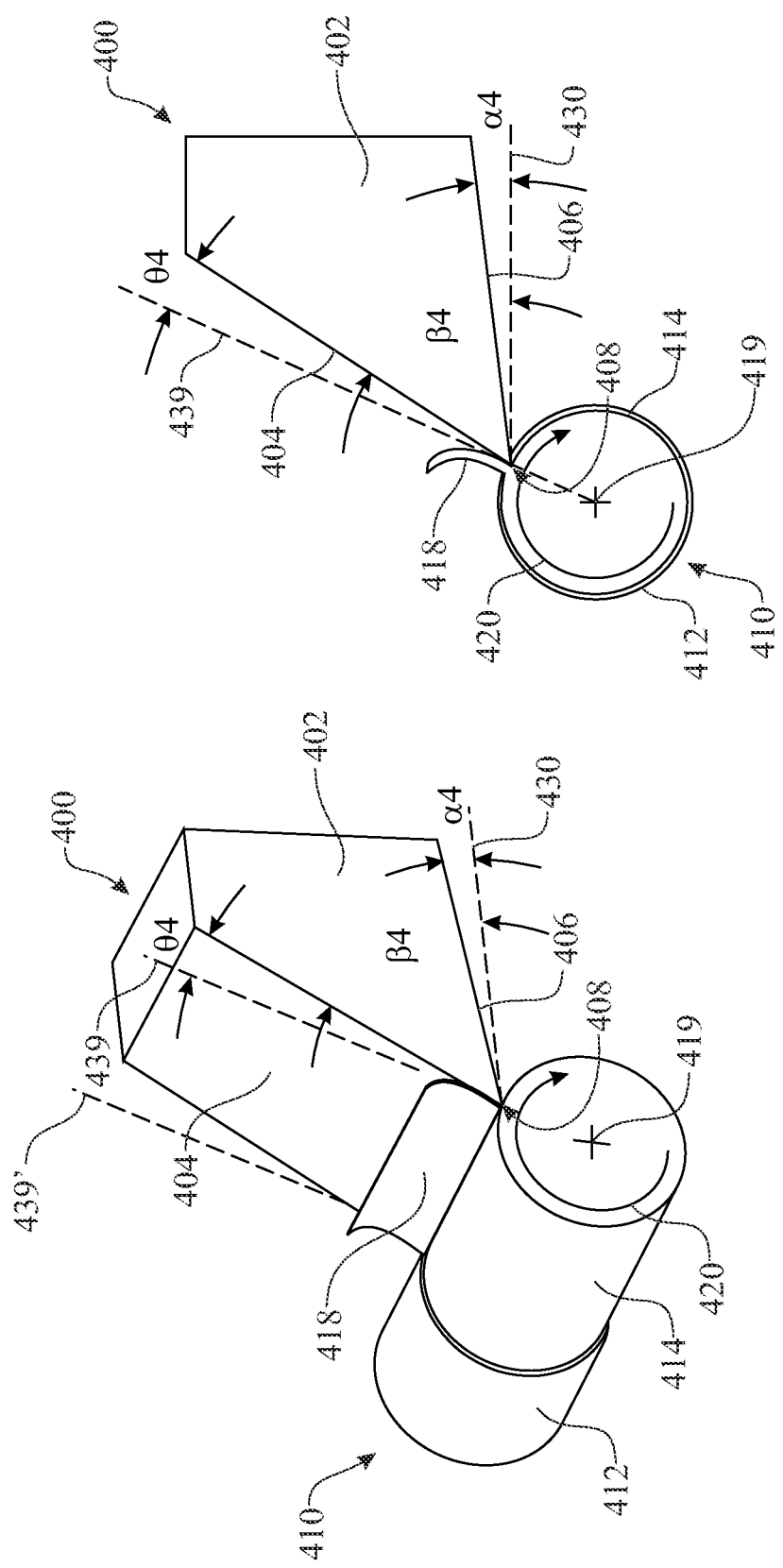

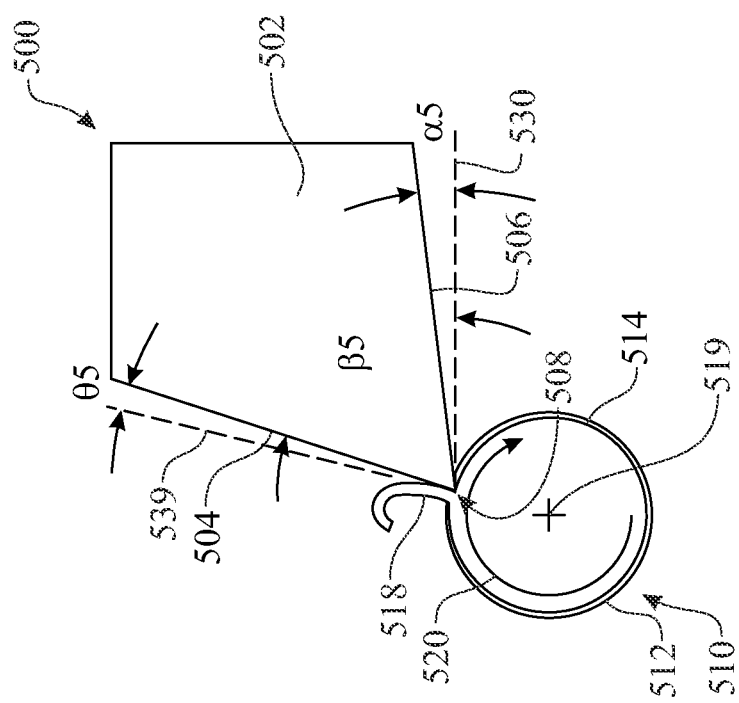
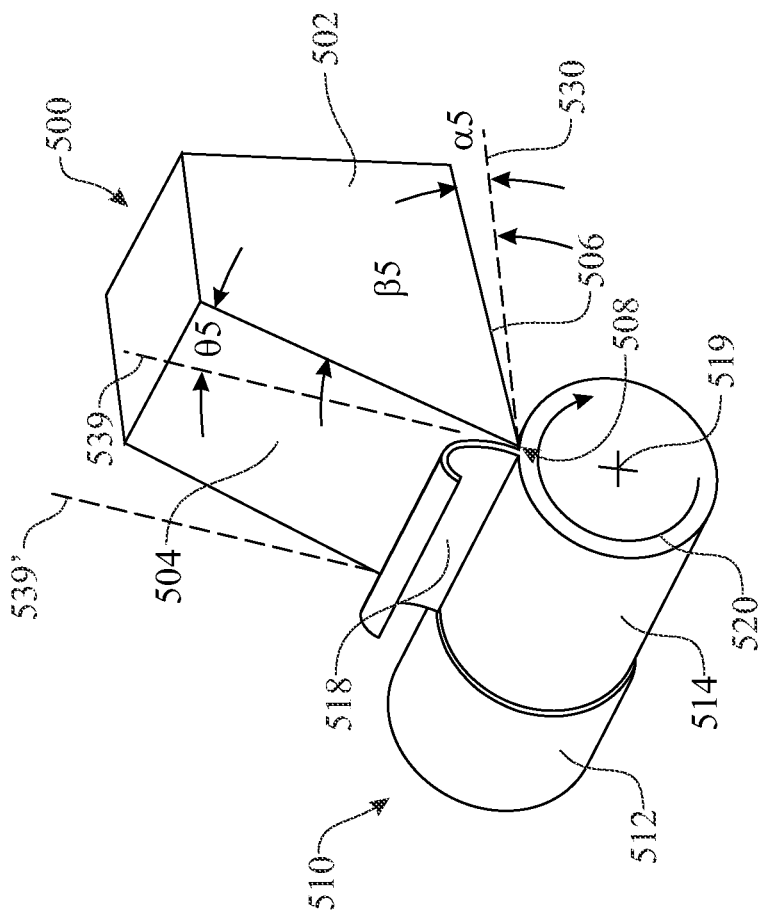
FIG. 5A
FIG. 5B

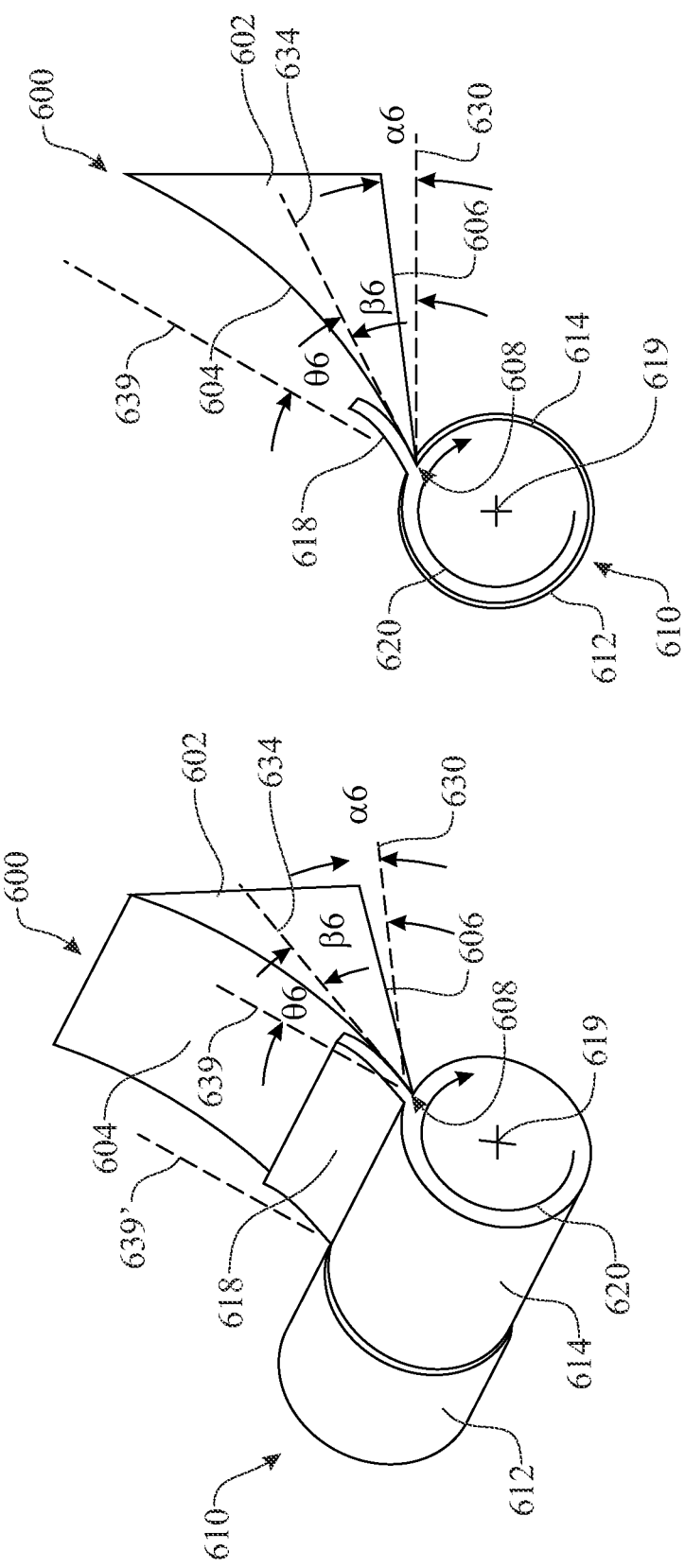

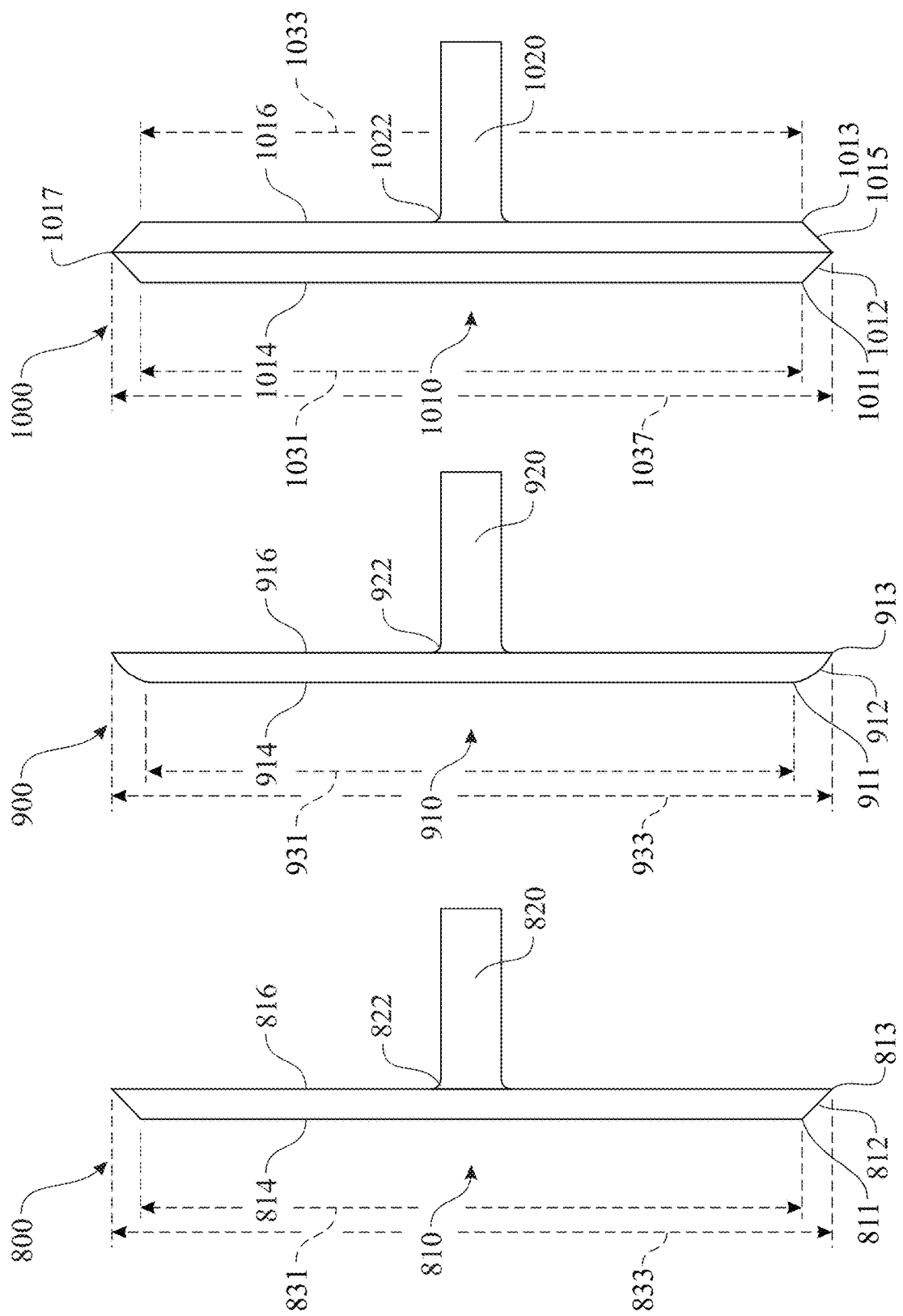

CONSTANT RAKE FLUTED DRILL BIT AND METHOD OF MANUFACTURE

CROSS REFERENCE TO RELATED APPLICATIONS

This application is a Non-Provisional Utility Application claiming the benefit of Provisional Patent Application Ser. No. 63/447,623, filed on Feb. 22, 2023, which is incorporated by reference herein in its entirety.

FIELD OF THE INVENTION

The present invention relates to a drill bit, and more particularly, a drill bit comprising a planar section having a linear cutting edge at a tip of the drill bit, wherein the planar section then transitions into a fluted section. The drill bit would preferably comprise at least two planar sections which transition into a respective fluted section. The present invention further relates to a method of manufacturing the drill bit comprising a planar section having a linear cutting edge at a tip of the drill bit.

BACKGROUND OF THE INVENTION

Drill bits are offered in a variety of configurations. A universally used and most common drill bit is a twisted (helical) fluted bit. A twist (helical) bit gets its name from the spiraled grooves, called flutes, along its body. As the bit bites into the work material, the flutes direct waste material up and out of the hole. Twisted or fluted drill bits formed from a cylindrically shaped stock of material are formed by a grinding tool having a continuously curved surface. The continuously curved surface forms a curved cutting edge that continues into a flute having a concave cross section shape. The curved cutting edge presents a less than optimal cutting process.

Drill bits are commonly fabricated of high speed steel, tungsten carbide, or other materials. Carbide PCB bits are estimated to outlast high-speed steel bits by a factor of ten or more.

A step drill bit is commonly a fluted drill bit having the tip ground down to a different diameter. The transition between the ground diameter and the original diameter is either straight, to form a counterbore, or angled, to form a countersink. The advantage to this style is that both diameters have the same flute characteristics, which keeps the bit from clogging when drilling in softer materials, such as aluminum; in contrast, a drill bit with a slip-on collar does not have the same benefit.

Brad bits and masonry bits, are variations on the basic twist bit structure. A brad point bit is a variation of the twist drill bit which is optimized for drilling in wood. The center of the brad point drill bit is given not the conically shaped chisel formed on a common twist drill bit, but a spur with a sharp point, and four sharp corners to cut the wood. While drilling, the sharp point of the spur pushes into the soft wood to keep the drill bit in line. A masonry bit is a variation of the twist drill bit which is optimized for drilling in concrete. The bulk of a masonry bit is fabricated of a relatively soft steel, and is machined with a mill rather than ground. An insert of tungsten carbide is brazed into the steel to provide the cutting edges.

A wood spade bit is used for rough boring in wood. Wood spade bits tend to cause splintering when the bit emerges from the workpiece. Woodworkers often avoid splintering the backside of the workpiece by finishing the hole from the opposite side thereof. Spade bits are flat, with a centering point and two cutters. The cutters are often equipped with spurs, wherein the spurs are provided to help ensure a cleaner hole.

Forstner bits bore precise, flat-bottomed holes in wood, in any orientation with respect to the wood grain. Forstner bits include a center brad point which guides it throughout the cut (and incidentally spoils the otherwise flat bottom of the hole). The cylindrical cutter around the perimeter shears the wood fibers at the edge of the bore, and also helps guide the bit into the material more precisely.

Forstner bits have radial cutting edges to plane off the material at the bottom of the hole. Forstner bits can cut on the edge of a block of wood, and can cut overlapping holes. Forstner bits are normally used in drill presses, lathes, and in hand-held electric drills. The flat bottom of the resulting hole formed by the forstner bit is preferred for creating bores. Because of the flat bottom of the hole, they are useful for drilling through veneer already glued to add an inlay.

Forstner bits commonly have two radial edges, although other designs may have more radial edges. Forstner bits lack a mechanism to clear chips from the hole, and therefore must be pulled out periodically.

In certain designs, the cutting edges are fabricated of tungsten carbide and brazed to a steel body. This provides a cutting surface that has an extended life when cutting abrasive materials, such as particle board, MDF, and the like.

Sawtooth bit variants of forstner bits are also available, which include many more cutting edges to the cylinder. Sawtooth bits tend to cut faster, but produce a more ragged hole. Sawtooth bits have advantages over forstner bits when boring into end grain.

A center bit comprises a center having a tapered screw thread. The center bit screws into the wood as the bit is turned, and pulls the bit into the wood. The center bit design lacks a need for any force to push the bit into the workpiece. The center bit only requires a torque to turn the bit for operation. This is an ideal bit when using a hand tool. The radial cutting edges remove a slice of wood of thickness equal to the pitch of the central screw for each rotation of the bit. To remove the center bit from the hole, either the created female thread in the workpiece must be stripped, or the rotation of the center bit must be reversed to avoid damaging the created female thread.

The edge of the center bit has a sharpened spur to cut the fibers of the wood, as in the brad point drill bit. A radial cutting edge planes the wood from the base of the hole. In this version, there is minimal or no spiral to remove chips from the hole. The bit must be periodically withdrawn to clear the chips.

An auger bit is a variation of the center bit. The auger bit introduces a long deep spiral flute for effective chip removal. Auger bits commonly include a threaded point extending forward from a single radial cutting edge at an end of a single flute.

The fluted or twist drill bits are the most commonly used bits. These bits include a cutting edge that is formed in conjunction with each flute. The cutting edge is arched or curved. A rake of the cutting face is also curved.

Accordingly, there remains a need in the art for a more efficient fluted drill bit for universal use.

SUMMARY OF THE INVENTION

The present invention overcomes the deficiencies of the known art by disclosing a design and an associated method of manufacturing a twisted, helical or fluted drill bit.

In accordance with one embodiment of the present invention, the invention consists of a twisted, helical or fluted drill bit comprising:

a planar rake section provided at a distal cutting end of the drill bit;

a flute extending from a shank sided edge of the planar rake section towards and proximate to a shank of the drill bit, wherein the entire drill bit is fabricated from a unitary drill blank.

In a second aspect, the drill bit further comprising:

a second planar rake section provided at the distal cutting end of the drill bit; and a second flute extending from a shank sided edge of the second planar rake section towards and proximate to the shank of the drill bit.

In another aspect, the drill bit further comprising:

an nth planar rake section provided at the distal cutting end of the drill bit; and an nth flute extending from a shank sided edge of the nth planar rake section towards and proximate to the shank of the drill bit.

In yet another aspect, the flute is helical.

In yet another aspect, the drill bit comprises two flutes.

In yet another aspect, the drill bit comprises three flutes.

In yet another aspect, the drill bit comprises four flutes.

In yet another aspect, the drill bit comprises two helical flutes.

In yet another aspect, the drill bit comprises three helical flutes.

In yet another aspect, the drill bit comprises four helical flutes.

In yet another aspect, the fluted drill bit is commonly in a range in diameter from 0.002 to 3.5 in (0.051 to 88.900 mm) and is commonly as long as 25.5 in (650 mm).

In yet another aspect, the distal cutting end of the drill bit is formed having point angle.

In yet another aspect, the point angle is approximately 118 degrees.

In yet another aspect, the point angle is approximately 118 degrees for use in wood, metal, plastic, and most other materials.

In yet another aspect, the point angle is 118 degrees.

In yet another aspect, the point angle is a more aggressive (smaller) angle.

In yet another aspect, the point angle is a more aggressive (smaller) angle, such as approximately 90 degrees.

In yet another aspect, the point angle is approximately 90 degrees.

In yet another aspect, the point angle is approximately 90 degrees for use on very soft plastics and other materials having a lower hardness rating.

In yet another aspect, the point angle is a shallower (larger) angle.

In yet another aspect, the point angle is a shallower (larger) angle, such as approximately 150 degrees.

In yet another aspect, the point angle is approximately 150 degrees.

In yet another aspect, the point angle is approximately 150 degrees for use on steels and other materials having a higher hardness rating.

In yet another aspect, the drill bit is formed having a blunt distal cutting end (no point angle).

In yet another aspect, the drill bit is formed having a blunt distal cutting end (no point angle) for forming a blind, flat-bottomed hole.

In yet another aspect, the cutting edge provided at a leading edge of the cutting surface of the drill bit can be defined by a rake angle.

In yet another aspect, the rake angle of the cutting edge of the drill bit would be respective to a target material to be drilled.

In yet another aspect, a high positive rake angle of the cutting edge of the drill bit would be desired for soft materials.

In yet another aspect, a near neutral rake angle of the cutting edge of the drill bit would be desired for harder materials.

In another aspect, the drill bit is fabricated of low carbon steel.

In another aspect, the drill bit is fabricated of high carbon steel.

In another aspect, the drill bit is fabricated of hardened and tempered carbon steel.

In another aspect, the drill bit is fabricated of high speed steel.

In another aspect, the drill bit is fabricated of carbide.

In another aspect, the drill bit is fabricated of tungsten carbide.

In another aspect, the drill bit is fabricated including Polycrystalline diamond (PCD).

In another aspect, the drill bit is coated with black oxide.

In another aspect, the drill bit is coated with Titanium nitride (TiN).

In another aspect, the drill bit is coated with Titanium aluminum nitride (TiAlN).

In another aspect, the drill bit is coated with Diamond powder.

In another aspect, the drill bit is coated with Zirconium nitride.

In another aspect, the drill bit is coated with Al-Chrome Silicon Nitride (AlCrSi/Ti) N.

In another aspect, the drill bit is coated with Boron-Aluminum-Magnesium (BAM) BAlMgB14.

In another aspect, the drill bit is fabricated using one of: low carbon steel, high carbon steel, hardened carbon steel, tempered carbon steel, high speed steel, carbide, tungsten carbide, Polycrystalline diamond (PCD), black oxide, Titanium nitride (TiN), Titanium aluminum nitride (TiAlN), Titanium carbon nitride (TiCN), Diamond powder, Zirconium nitride, Al-Chrome Silicon Nitride (AlCrSi/Ti) N, Boron-Aluminum-Magnesium (BAM) BAlMgB14, or any other suitable material.

In another aspect, the drill bit is fabricated using at least one of: low carbon steel, high carbon steel, hardened carbon steel, tempered carbon steel, high speed steel, carbide, tungsten carbide, Polycrystalline diamond (PCD), black oxide, Titanium nitride (TiN), Titanium aluminum nitride (TiAlN), Titanium carbon nitride (TiCN), Diamond powder, Zirconium nitride, Al-Chrome Silicon Nitride (AlCrSi/Ti) N, Boron-Aluminum-Magnesium (BAM) BAlMgB14, and any other suitable material.

In respect to fabrication, the present invention includes a method of manufacturing a constant rake fluted drill bit, the method comprising steps of:

securing a drill bit stock in a machine;

initiating a rotation of a machining wheel;

bringing at least one of the rotating machining wheel and the drill bit stock towards the other of the rotating machining wheel and the drill bit stock;

removing material from the drill bit stock at a location proximate a distal cutting end thereof using the rotating machining wheel, while the drill bit stock remains at a constant angle to create a planar rake section;

once the rotating machining wheel reaches predetermined depth, a linear motion of the drill bit stock is initiated;

once the rotating machining wheel reaches predetermined depth, a rotational motion of the drill bit stock is initiated; and removing material from the drill bit stock using the rotating machining wheel, while the drill bit stock is moving in a linear motion and a rotational motion to create a flute from a shank sided edge of the planar rake section to a shank creating a twisted (helical) flute.

In respect to fabrication, the present invention includes a method of manufacturing a constant rake fluted drill bit, the method comprising steps of:

secureing a drill bit stock in a machine;
initiating a rotation of a machining wheel;
bringing at least one of the rotating machining wheel and the drill bit stock towards the other of the rotating machining wheel and the drill bit stock, the motion being in a direction generally perpendicular to an elongated axis of the drill bit stock;
removing material from the drill bit stock at a location proximate a distal cutting end thereof using the rotating machining wheel, while the drill bit stock remains at a constant angle to create a planar rake section;
once the rotating machining wheel reaches predetermined depth, a combination of a linear motion and a rotational motion of the drill bit stock is initiated; and
removing material from the drill bit stock using the rotating machining wheel, while the drill bit stock is moving in a linear motion and a rotational motion to create a flute from a shank sided edge of the planar rake section to a shank creating a twisted (helical) flute, the linear rake section extending from a bottom of the flute to a circumferential surface of the drill bit blank.

In respect to fabrication, the present invention includes another method of manufacturing a constant rake fluted drill bit, the method comprising steps of:

securing a drill bit stock in a machine;
initiating a rotation of a machining wheel;
initiating a rotation and linear motion of the drill bit stock;
bringing at least one of the rotating machining wheel and the rotating drill bit stock towards the other of the rotating machining wheel and the rotating drill bit stock at a location proximate a shank portion of the drill bit;
removing material from the drill bit stock starting at the location proximate the shank portion of the drill bit and continuing towards the distal cutting end thereof using the rotating machining wheel, while the drill bit stock moves in a rotational and linear motion forming a flute;
terminating the rotation and linear motion of the drill bit stock when the rotating machining wheel approaches a cutting tip region of the drill bit;
moving the machining wheel in a linear and angular motion to create a rake angle at the tip of the drill bit;
separating the machining wheel and the drill bit from one another.

In respect to fabrication, the present invention includes another method of manufacturing a constant rake fluted drill bit, the method comprising steps of:

securing a drill bit stock in a machine;
initiating a rotation of a machining wheel;
bringing at least one of the rotating machining wheel and the drill bit stock towards the other of the rotating machining wheel and the drill bit stock at a location proximate a drill bit shank portion of the drill bit blank, the motion being in a direction generally perpendicular to an elongated axis of the drill bit stock;
initiating a combination of a linear motion and a rotational motion of the drill bit stock when the rotating machining wheel is between a radial position between initial contact with a circumferential surface of the drill bit blank and a predetermined depth as determined by the bit design;
removing material from the drill bit stock using the rotating machining wheel, while the drill bit stock is moving in a linear motion and a rotational motion to create a flute from a shank sided edge of the planar rake section to a shank creating a twisted (helical) flute,
ceasing the combination of the linear motion and the rotational motion of the drill bit stock when a distal radial edge of the rotating machining wheel reaches a position proximate a free end of the drill bit stock,
radially separating the rotating machining wheel and the drill bit stock from one another, the motion being in a direction generally perpendicular to an elongated axis of the drill bit stock;
wherein the step of radially separating the rotating machining wheel and the drill bit stock from one another, the motion being in a direction generally perpendicular to an elongated axis of the drill bit stock creates a linear rake section extending from a helically shaped section created in the step of removing material from the drill bit stock using the rotating machining wheel, while the drill bit stock is moving in a linear motion and a rotational motion to create a flute from a shank sided edge of the planar rake section to a shank creating a twisted (helical) flute to the free end of the drill bit stock, the linear rake section extending from a bottom of the flute to the circumferential surface of the drill bit blank.

In respect to fabrication, the present invention includes another method of manufacturing a constant rake fluted drill bit, the method comprising steps of:

securing a drill bit stock in a machine;
initiating a rotation of a machining wheel;
bringing at least one of the rotating machining wheel and the drill bit stock towards the other of the rotating machining wheel and the drill bit stock at a location proximate a drill bit shank portion of the drill bit blank, the motion being in a direction generally perpendicular to an elongated axis of the drill bit stock;
initiating a combination of a linear motion and a rotational motion of the drill bit stock when the rotating machining wheel is between a radial position between initial contact with a circumferential surface of the drill bit blank and a predetermined depth as determined by the bit design;
removing material from the drill bit stock using the rotating machining wheel, while the drill bit stock is moving in a linear motion and a rotational motion to create a flute from a shank sided edge of the planar rake section to a shank creating a twisted (helical) flute,
ceasing the combination of the linear motion and the rotational motion of the drill bit stock when a distal radial edge of the rotating machining wheel reaches a position proximate a free end of the drill bit stock,
radially separating the rotating machining wheel and the drill bit stock from one another, the motion being in a direction generally perpendicular to an elongated axis of the drill bit stock;
wherein the step of radially separating the rotating machining wheel and the drill bit stock from one another, the motion being in a direction generally perpendicular to an elongated axis of the drill bit stock creates a linear rake section extending from a helically shaped section created in the step of removing material from the drill bit stock using the rotating machining wheel, while the drill bit stock is moving in a linear motion and a rotational motion to create a flute from a shank sided edge of the planar rake section to a shank creating a twisted (helical) flute to the free end of the drill bit stock, the linear rake section extending from a bottom of the flute to the circumferential surface of the drill bit blank.

In a second aspect, the method further comprising a step of continuing with the linear motion of the drill bit stock while continuing to remove material from the drill bit stock using the rotating machining wheel for a desired distance creating a substantially tangent relationship between a helix angle and the linear rake surface, wherein the step occurs between the step of ceasing the combination of the linear motion and the rotational motion of the drill bit stock when a distal radial edge of the rotating machining wheel reaches a position proximate a free end of the drill bit stock and the step of radially separating the rotating machining wheel and the drill bit stock from one another, the motion being in a direction generally perpendicular to an elongated axis of the drill bit stock.

In another aspect, the method further comprising a step of forming a pointed tip at an end of the drill bit stock.

In yet another aspect, the method further comprising a step of forming a pointed tip at an end of the drill bit stock, wherein a demarcation between the linear rake section and the helically shaped section is located proximate a transition between the pointed tip and a cylindrical exterior surface of the drill bit stock.

In yet another aspect, the method further comprising a step of establishing a total number of desired flutes.

In yet another aspect, the method further comprising a decision step to determine if the number of flutes completed is the designed number of flutes.

In yet another aspect, the method further comprising a step of rotating the drill bit stock by 360 degrees/number of flutes and repeating the process of machining the flute and rake angle in a condition where the number of flutes completed is less than the designed number of flutes.

In yet another aspect, the machining wheel is a grinding wheel.
   establishing a total number of desired flutes;
   repeatably processing a step of rotating the drill bit stock by an angle of 360/total number of desired flutes and steps of:
      bringing at least one of the rotating machining wheel and the drill bit stock towards the other of the rotating machining wheel and the drill bit stock, the motion being in a direction generally perpendicular to an elongated axis of the drill bit stock;
      removing material from the drill bit stock at a location proximate a distal cutting end thereof using the rotating machining wheel, while the drill bit stock remains at a constant angle to create a planar rake section;
      once the rotating machining wheel reaches predetermined depth, a combination of a linear motion and a rotational motion of the drill bit stock is initiated;
   repeating the above steps until the number of flutes machined in the drill bit stock equals the total number of desired flutes; and
terminating the machining of the drill bit in a condition where the number of flutes machined in the drill bit stock is equal to the total number of desired flutes.

In yet another aspect, the method further comprising a step of:
   aligning a radially distant edge of a machining surface of the rotating machining wheel to cut into a distal end of the drill bit stock.

In yet another aspect, the machining wheel is a grinding wheel.

In yet another aspect, the machining wheel is a grinding wheel and the machining process is a grinding process.

In yet another aspect, the machining wheel is a cutting wheel and the machining process is a cutting process.

In yet another aspect, the method further comprising a step of introducing a lubricant between the machining wheel and the drill bit stock during the machining process.

In yet another aspect, the rotational motion of the drill bit stock initiates after initiation of the linear motion of the drill bit stock.

In yet another aspect, the process is repeated to create a second planar rake section and respective second flute.

In yet another aspect, the process is repeated to create an nth planar rake section and nth respective flutes.

In yet another aspect, the method further comprising a step of forming a conically shaped distal cutting end on the drill bit stock.

In yet another aspect, the method further comprising a step of forming a conically shaped distal cutting end on the drill bit stock, the conically shaped distal cutting end having a desired point angle.

In yet another aspect, the method further comprising a step of forming a conically shaped distal cutting end on the drill bit stock, the conically shaped distal cutting end having a desired point angle, wherein the desired point angle is approximately 118 degrees.

In yet another aspect, the method further comprising a step of forming a conically shaped distal cutting end on the drill bit stock, the conically shaped distal cutting end having a desired point angle, wherein the desired point angle is approximately 90 degrees.

In yet another aspect, the method further comprising a step of forming a conically shaped distal cutting end on the drill bit stock, the conically shaped distal cutting end having a desired point angle, wherein the desired point angle is approximately 150 degrees.

In yet another aspect, the method can be completed on modern day tool/cutter grinders.

In yet another aspect, the method further comprising a step of machining a variable flute.

In yet another aspect, the method further comprising a step of machining a flute having a helix angle between 20 and 30 degrees for drill bits designated for general use.

In yet another aspect, the method further comprising a step of machining a flute having a helix angle between 30 and 80 degrees for drill bits designated for use in drilling deep holes or holes into softer materials.

In yet another aspect, the method further comprising a step of machining a flute having a helix angle that is greater than zero and less than 45 degrees for drill bits designated for use in drilling holes into harder or stronger materials.

In yet another aspect, a rate of rotation of the drill bit stock and a rate of an axial motion of the drill bit stock respective to the machining wheel during the step of removing material from the drill bit stock using the rotating machining wheel, while the drill bit stock is moving in a linear motion and a rotational motion to create a flute from a shank sided edge of the planar rake section to a shank creating a twisted (helical) flute, the linear rake section extending from a bottom of the flute to a circumferential surface of the drill bit blank creates a helix angle is one of:

between 20 and 30 degrees for drill bits designated for general use, between 30 and 80 degrees for drill bits designated for use in drilling deep holes or holes into softer materials, or greater than zero and less than 45 degrees for drill bits designated for use in drilling holes into harder or stronger materials.

In yet another aspect, the rotational motion of the drill bit stock during the step of removing material from the drill bit stock using the rotating machining wheel, while the drill bit stock is moving in a linear motion and a rotational motion to create a flute from a shank sided edge of the planar rake section to a shank creating a twisted (helical) flute, the linear rake section extending from a bottom of the flute to a circumferential surface of the drill bit blank creates a helix angle is one of:

clockwise to generate a right hand twist drill bit, or counterclockwise to generate a left hand twist drill bit, when the machining process initializes at a free (tip) end of the drill bit blank.

In yet another aspect, the rotational motion of the drill bit stock during the step of removing material from the drill bit stock using the rotating machining wheel, while the drill bit stock is moving in a linear motion and a rotational motion to create a flute from a shank sided edge of the planar rake section to a shank creating a twisted (helical) flute, the linear rake section extending from a bottom of the flute to a circumferential surface of the drill bit blank creates a helix angle is one of:

counterclockwise to generate a right hand twist drill bit, or clockwise to generate a left hand twist drill bit, when the machining process initializes at a shank end of the drill bit blank.

In yet another aspect, the machining wheel having a machining surface shaped in accordance with one of:

a first radial surface having a first diameter and a second radial surface having a second diameter, wherein the first diameter is smaller than the second diameter, a first radial surface having a first diameter and a second radial surface having a second diameter, wherein a difference between the first diameter and the second diameter is greater than the predetermined depth, the machining surface extending between a maximum outer circumferential edge and an inner circumferential edge, wherein a distance between the maximum outer circumferential edge and the inner circumferential edge is equal to or greater than the predetermined depth, the machining surface extending as a conical frustum shape between a maximum outer circumferential edge and an inner circumferential edge, wherein a distance between the maximum outer circumferential edge and the inner circumferential edge is equal to or greater than the predetermined depth, or the machining surface comprising a pair of opposing conical frustum shape surfaces extending between a centrally located maximum outer circumferential edge and each of a first inner circumferential edge of the first of the pair of opposing conical frustum shape surfaces and a second inner circumferential edge of the second of the pair of opposing conical frustum shape surfaces.

In yet another aspect, the method further comprising a step of machining a variable flute having a variable helix angle along at least a portion of a length of the drill bit.

In yet another aspect, the method further comprising a step of hardening the material used to fabricate the drill bit after machining the drill bit.

In yet another aspect, the method further comprising a step of coating a surface of the formed drill bit.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which:

FIG. 2A presents an isometric view of an exemplary cutting tool including a planar cutting tool face having a variable rake angle, the cutting tool shown removing material from the round stock;

FIG. 2B presents an elevation view of the exemplary variable rake angle cutting tool originally introduced in FIG. 2A, the illustration presenting the cutting tool removing material from a round stock;

FIG. 4A presents an isometric view of an exemplary cutting tool including a planar cutting tool face having a medium rake angle, the cutting tool shown removing material from a round stock;

FIG. 4B presents an elevation view of the exemplary medium cutting tool originally introduced in FIG. 4A, the illustration presenting the cutting tool removing material from the round stock;

FIG. 5A presents an isometric view of an exemplary cutting tool including a planar cutting tool face having a low positive (near neutral) rake angle, the cutting tool shown removing material from the round stock;

FIG. 5B presents an elevation view of the exemplary low positive (near neutral) rake cutting tool originally introduced in FIG. 5A, the illustration presenting the cutting tool removing material from the round stock;

FIG. 6A presents an isometric view of an exemplary cutting tool including a concave cutting tool face having a high positive, concave rake angle, the cutting tool shown removing material from the round stock;

FIG. 6B presents an elevation view of the exemplary concave faced high positive, concave rake angle cutting tool originally introduced in FIG. 6A, the illustration presenting the cutting tool removing material from a round stock;

FIG. 26 presents an elevation side view of the exemplary machining wheel originally illustrated in FIG. 9;

FIG. 27 presents an elevation side view of a first exemplary modified machining wheel; and FIG. 28 presents an elevation side view of a second exemplary modified machining wheel;

Like reference numerals refer to like parts throughout the several views of the drawings.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
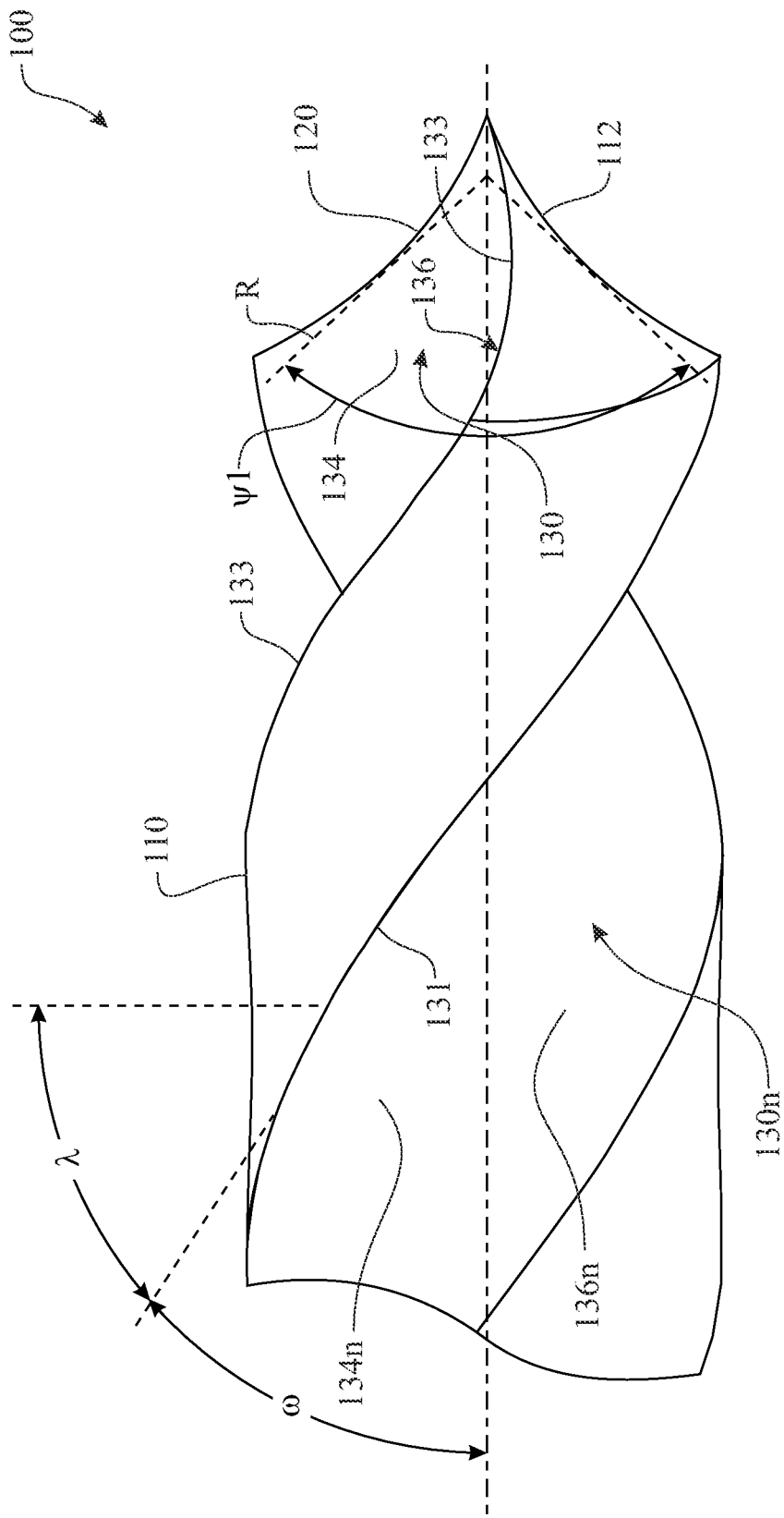
FIG. 1 presents an enlarged side elevation view of a twisted (helical) drill bit in accordance with known prior art.

For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Drill bits are offered in a variety of shapes and sizes. Each type of drill bit is designed for a specific or group of applications, including considerations of a desired cut, a hardness of the material to be cut, and any consideration of a uniformity (grain, porosity, composition, and the like) of the material. The cutting region of a drill bit includes a cutting face and a cutting edge. The cutting face is designed with a specific surface shape and a cutting angle.

A cutting face having a more aggressive angle is best suited for softer materials, such as plastics and other materials. The cutting face having a more aggressive angle is known to cut very quickly, but would wear rapidly when cutting hard materials.

A cutting face having a shallower angle is best suited for tougher or harder materials, such as metals, steels, and other tougher materials. Cutting into tougher or harder materials commonly requires a starter hole. The cutting face having a shallower angle does not tend to bind or suffer premature wear when suitable feed rate is used.

Currently available twisted (helical) drill bits 100 are fabricated using a machining tool having a convex shaping surface, resulting in a cutting edge 120 and associated flute 130 having a concave cross section shape, as illustrated in FIG. 1. The commercially available twisted (helical) drill bit 100 includes a twisted drill bit circumferential surface 110, which is equal to or slightly smaller than a diameter of the commercially available twisted drill bit 100. A drill stock conically shaped end 112 is formed at a cutting end of the commercially available twisted drill bit 100. The drill stock conically shaped end 112 is formed having a concave conical shape. The concave conical shape of the drill stock conically shaped end 112 has an effective tip angle $\psi 1$ measured between each effective cutting edge radius R.

The commercially available twisted (helical) drill bit 100 is fabricated using a cutting or grinding wheel having an arch shaped circumferential surface resulting in a formation of a first helical flute formation 130 and a nth helical flute formation 130n (the nth flute formation 130n is representative of a second and any subsequent flute of the commercially available twisted (helical) drill bit 100) having a continuously arched concave shape. Each flute includes a flute material collection surface 134, 134n, which defines a leading edge 131 of the flute 130, 130n that can include a cutting edge and collects the removed material and a flute clearance surface 136, 136n, which defines a trailing portion of the flute, terminating at a trailing edge 133 of the flute 130, 130n. Most commercially available twisted (helical) drill bits 100 have two flutes 130, 130n. Each flute is formed at an angle, wherein the orientation of the flute can be referenced by a helix angle $\omega$ (measured between a cutting edge of each respective flute 130, 130n and a centerline of the commercially available twisted (helical) drill bit 100). Alternatively, the orientation of the flute can be referenced by a lead angle $\lambda$ (angle between a leading or cutting edge of each respective flute 130, 130n and a radial axis of the commercially available twisted (helical) drill bit 100).

Each flute can have a helix angle between 20 and 30 degrees for drill bits designated for general use, a helix angle between 30 and 80 degrees for drill bits designated for use in drilling deep holes or holes into softer materials, or a helix angle that is greater than zero and less than 45 degrees for drill bits designated for use in drilling holes into harder or stronger materials.

The manufacturing process of the commercially available twisted (helical) drill bit 100 creates the concave cross section shape of the drill stock conically shaped end 112 and the concave cross section shape of the first helical flute formation 130, resulting in a complex curved shape of the drill bit cutting edge 120. The complex curved shape of the cutting edge and face decreases the efficiency of the commercially available twisted (helical) drill bit 100.

The affectivity of different shapes and angles of cutting surfaces and rake angles is best represented by illustrating various cutting tools shearing a rotating stock of material. Examples of different cutting face designs and angles are presented in FIGS. 2 though 6, with each being shown in an isometric view (A) and a side elevation view (B). The general concept behind a common fluted drill bit 100 (FIG. 1) is exemplified in FIGS. 2A and 2B. The general concept behind a constant rake fluted drill bit 700 (FIGS. 18 through 25) in accordance with the present invention are exemplified in FIGS. 3A, 3B, 4A, 4B, 5A, 5B, 6A, and 6B.

An exemplary cutting tool 200 cutting an exemplary round stock material 210 is presented in FIGS. 2A and 2B. An arrangement where the cutting tool face 204 trails the normal reference 239, 239' (as shown), the rake angle is referred to as a positive rake angle. In an arrangement where the cutting tool face 204 leads the normal reference 239', the rake angle is referred to as a near neutral rake angle with the opposite edge 239 being representative of a high positive rake angle. The exemplary cutting tool face 204 of the cutting tool body 202 is referred to as a hybrid-rake face. A normal reference (representative of the axis of rotation of the drill bit) is representative of an axis of rotation of the commercially available twisted (helical) drill bit 100 for a standard, right hand cut drill bit. Similarly, the normal reference 239 (of a mirrored design of the cutting tool 200) is representative of the axis of rotation of the commercially available twisted (helical) drill bit 100 for a left hand cut drill bit.

In an arrangement where the cutting edge is advanced respective to the normal reference 239, 239' (not illustrated, but well known by those skilled in the art), the cutting edge would be referred to as a negative rake angle.

The cutting tool 200 includes a cutting tool body 202 having a cutting tool face 204 and a cutting tool flank 206. The cutting tool 200 is analogous to a cutting edge of the commercially available twisted (helical) drill bit 100. Adjoining edges of the cutting tool face 204 and the cutting tool flank 206 defines a tool cutting edge 208. The cutting tool body 202 is oriented to provide a relief (clearance) angle $\alpha 2$ between a horizontal axis 230 and the cutting tool flank 206. The relief (clearance) angle $\alpha 2$ provides a clearance between the cutting tool flank 206 and the stock material surface 212 of the round stock material 210.

The hybrid-rake face includes a cutting tool first face edge 203 of the cutting tool face 204 and a cutting tool second face edge 205. The cutting tool first face edge 203 is a leading cutting edge of the cutting tool face 204 and a cutting tool second face edge 205 is a trailing cutting edge of the cutting tool face 204. A first rake angle $\theta 2$ of the cutting tool face 204 is defined by the cutting tool first face edge 203 and the cutting tool second face edge 205 defines a second rake angle $\phi$ of the cutting tool face 204. The first cutting edge rake angle $\theta 2$ references the angle between the cutting tool first face edge 203 of the cutting tool face 204 and the normal reference 239, 239'. The second cutting edge rake angle $\phi$ references the angle between the cutting tool second face edge 205 of the cutting tool face 204 and the normal reference 239, 239'.

The cutting tool 200 is positioned respective to the round stock material 210 to orient the first rake angle $\theta 2$ at an angle that is nearly neutral. The second rake angle $\phi$, which is larger than first rake angle $\theta 2$ of the cutting tool 200, provides a higher positive rake angle compared to the first rake angle $\theta 2$.

An edge cutting angle $\beta 2$ references an angle between the cutting tool face 204 and the horizontal axis 230. A normal reference 239, 239' is a normal line respective to a stock rotational axis 219 of a round stock material 210 and point of contact between the tool cutting edge 208 and a stock material surface 212 of the round stock material 210.

The cutting process of the cutting tool 200, as illustrated in FIGS. 2A and 2B, is analogous to the cutting process of the commercially available twisted (helical) drill bit 100. A first rake angle $\theta 2$ presents a nearly neutral cutting angle and the second rake angle $\phi$ of the cutting tool face 204 presents a high positive rake cutting angle. The cutting tool first face edge 203 is representative of the average cutting edge of the drill bit 100 and the normal reference 239' is representative of a centerline of a right hand drill bit.

Similarly, the illustrations presented in FIGS. 3A, 3B through 6A, 6B are representative of cutting process of the constant rake fluted drill bit 700, which will be described in more detail later herein.

In use, the tool cutting edge 208 is positioned against the stock material surface 212 of the round stock material 210 while the round stock material 210 rotates about the stock rotational axis 219 in accordance with a stock rotational motion 220, where the tool cutting edge 208 removes chips 218 from the stock material surface 212 creating a shaped surface 214.

Figures 3A, 3B:
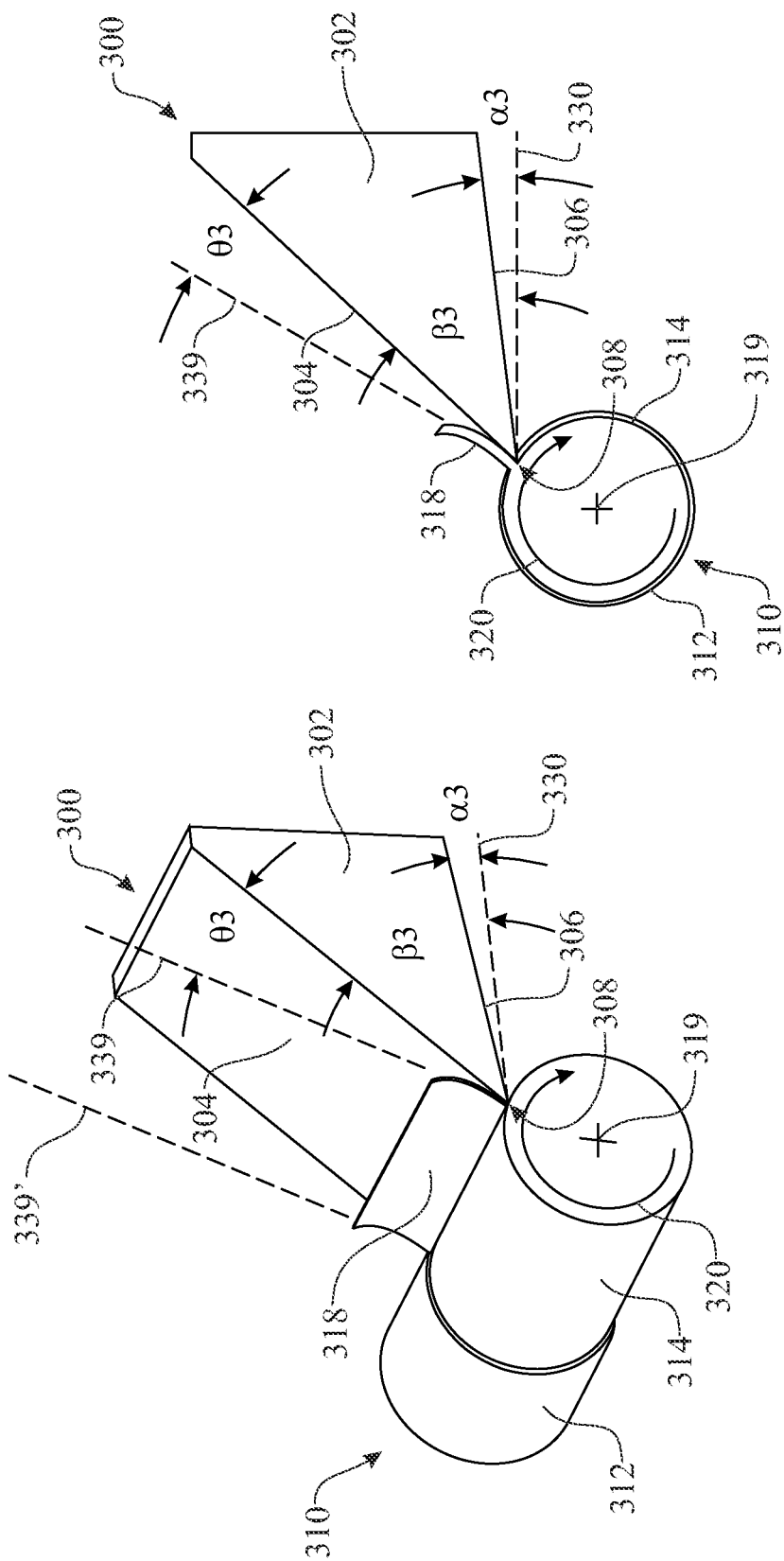
FIG. 3A presents an isometric view of an exemplary cutting tool including a planar cutting tool face having a high positive rake angle, the cutting tool shown removing material from a round stock.
FIG. 3B presents an elevation view of the exemplary high positive rake cutting tool originally introduced in FIG. 3A, the illustration presenting the cutting tool removing material from the round stock.

An exemplary cutting tool 300 cutting an exemplary round stock material 310 is presented in FIGS. 3A and 3B. The exemplary cutting tool 200, presented above, has a hybrid-rake face. The elements of the cutting tool 300 are the same those of the cutting tool 200 with the exception of a shape of a surface of the cutting tool face 304. The elements of the cutting tool 300 are numbered the same as like elements of the cutting tool 200, wherein the elements of the cutting tool 300 are preceded by the numeral "3". References identifying angles are succeeded by the numeral "3". The exemplary cutting tool 300 presents a constant high positive rake angle, wherein a cutting tool face 304 is parallel to a surface of the round stock material 310 being machined; more specifically, the cutting tool first face edge and the cutting tool second face edge have the same angle.

In use, the tool cutting edge 308 is positioned against the stock material surface 312 of the round stock material 310 while the round stock material 310 rotates about the stock rotational axis 319 in accordance with a stock rotational motion 320, where the tool cutting edge 308 removes a removed chip 318 from the stock material surface 312 creating a shaped surface 314.

An exemplary cutting tool 400 cutting an exemplary round stock material 410 is presented in FIGS. 4A and 4B. The elements of the cutting tool 400 are the same those of the cutting tool 300 with the exception of an angle θ4 of the cutting tool face 404. The elements of the cutting tool 400 are numbered the same as like elements of the cutting tool 300, wherein the elements of the cutting tool 400 are preceded by the numeral "4". References identifying angles are succeeded by the numeral "4". The exemplary cutting tool 400 has a rake angle θ4 which is smaller than rake angle θ3 of the cutting tool 300. A higher positive rake angle is commonly used to cut softer materials, such as aluminum or wood. This arrangement provides a design where the power required to push the cutting tool 300 into the workpiece is less than the power required to push the cutting tool 400 into the workpiece. Additionally using the cutting tool 300 (having a higher positive rake angle) generates less heat compared to the cutting tool 400, and generates less heat even more so when compared to the cutting tool 500, which has a nearly neutral rake angle.

A normal reference 339' is representative of an axis of rotation of the constant rake fluted drill bit 700 for a right hand cut drill bit. Similarly, the normal reference 339 of the same face 304 is representative of the axis of rotation of the constant rake fluted drill bit 700 for a left hand cut drill bit.

An exemplary cutting tool 500 cutting an exemplary round stock material 510 is presented in FIGS. 5A and 5B. The elements of the cutting tool 500 are numbered the same as like elements of the cutting tool 300, wherein the elements of the cutting tool 500 are preceded by the numeral "5". References identifying angles are succeeded by the numeral "5". The cutting tool 500 includes a cutting tool face 504 having a nearly neutral rake angle θ5. The angle of the cutting tool face 504 respective to the angle of the cutting tool flank 506 of the cutting tool body 502 is greater than the angle of the cutting tool face 404 respective to the angle of the cutting tool flank 406 of the cutting tool body 402. The cutting location is rotated about the stock material surface 512, maintaining a rake angle θ5 of the cutting tool 500 to be similar to the rake angle θ4 of the cutting tool 400. The larger angle between the cutting tool face 504 and the cutting tool flank 506 retains a shape of a tool cutting edge 508 over a longer period of time.

The nearly neutral rake angle θ5 is commonly used to cut hard or tough materials. The drawback of the nearly neutral rake θ5 is that this arrangement requires increased power to push the cutting tool 500 into the workpiece. Additionally using a cutting tool 500 with a nearly neutral rake generates large amounts of heat.

An exemplary cutting tool 600 cutting an exemplary round stock material 610 is presented in FIGS. 6A and 6B. The elements of the cutting tool 600 are numbered the same as like elements of the cutting tool 300, wherein the elements of the cutting tool 600 are preceded by the numeral "6". References identifying angles are succeeded by the numeral "6". The exemplary cutting tool face 604 has a concave surface. The exemplary cutting tool 600 has a rake angle θ6 which is significantly larger than rake angle θ3 of the cutting tool 300. A significantly higher positive rake angle is commonly used to cut softer materials, such as plastics, aluminum or wood.

The concave surface of the cutting tool face 604 provides for a thicker volume of material for the cutting tool body 602 to absorb heat and reinforce the structure of the cutting tool 600. Additionally, the concave surface of the cutting tool face 604 aids in directing the removed chip 618 from the cutting tool. The concave surface of the cutting tool face 604 aids in directing each removed chip 618 away from the cutting tool 600 and material stock 610. Reduced cutting energy and lower heat are the positive features of the cutting tool 600 and other cutting tools with similar features. A negative aspect of the cutting tool 600 and other cutting tools with similar features is the weakened cutting edge 608. Another negative aspect of the cutting tool 600 is production of longer chip 618.

Figure 29:
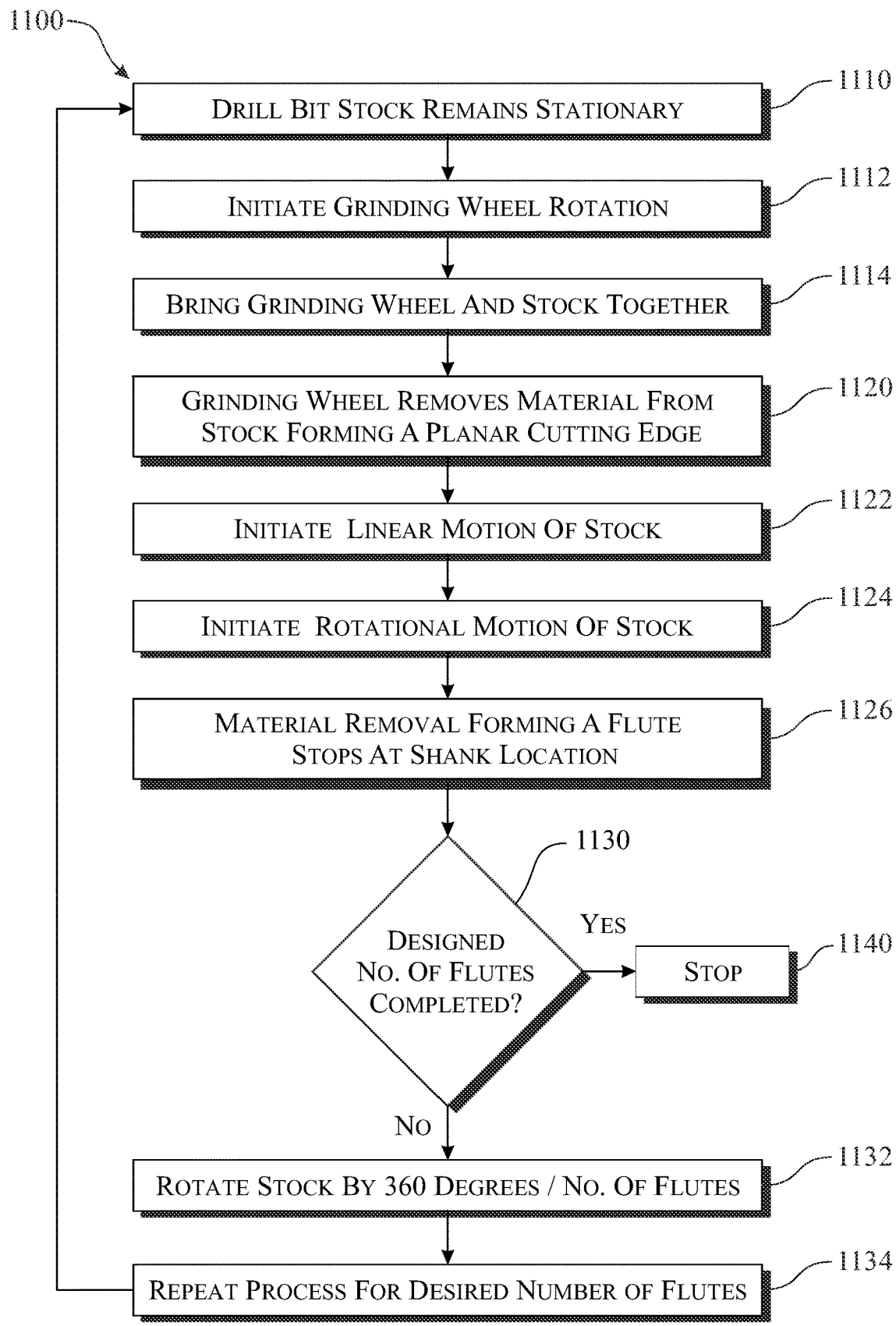
FIG. 29 presents an exemplary constant rake fluted drill bit fabrication flow diagram.

The following describes features of the constant rake fluted drill bit 700 and how the constant rake fluted drill bit 700 is fabricated. Steps of fabricating the constant rake fluted drill bit 700 are described in a drill bit manufacturing process 1100, presented in FIG. 29.

A constant rake planar cutting edge fluted drill bit 700 refers to a finished bit, with a partially fabricated version of constant rake planar cutting edge fluted drill bit 700 being identified by a suffix, wherein each suffix is associated with a respective partial completion of the constant rake planar cutting edge fluted drill bit 700 throughout the fabrication process.

Figure 7:
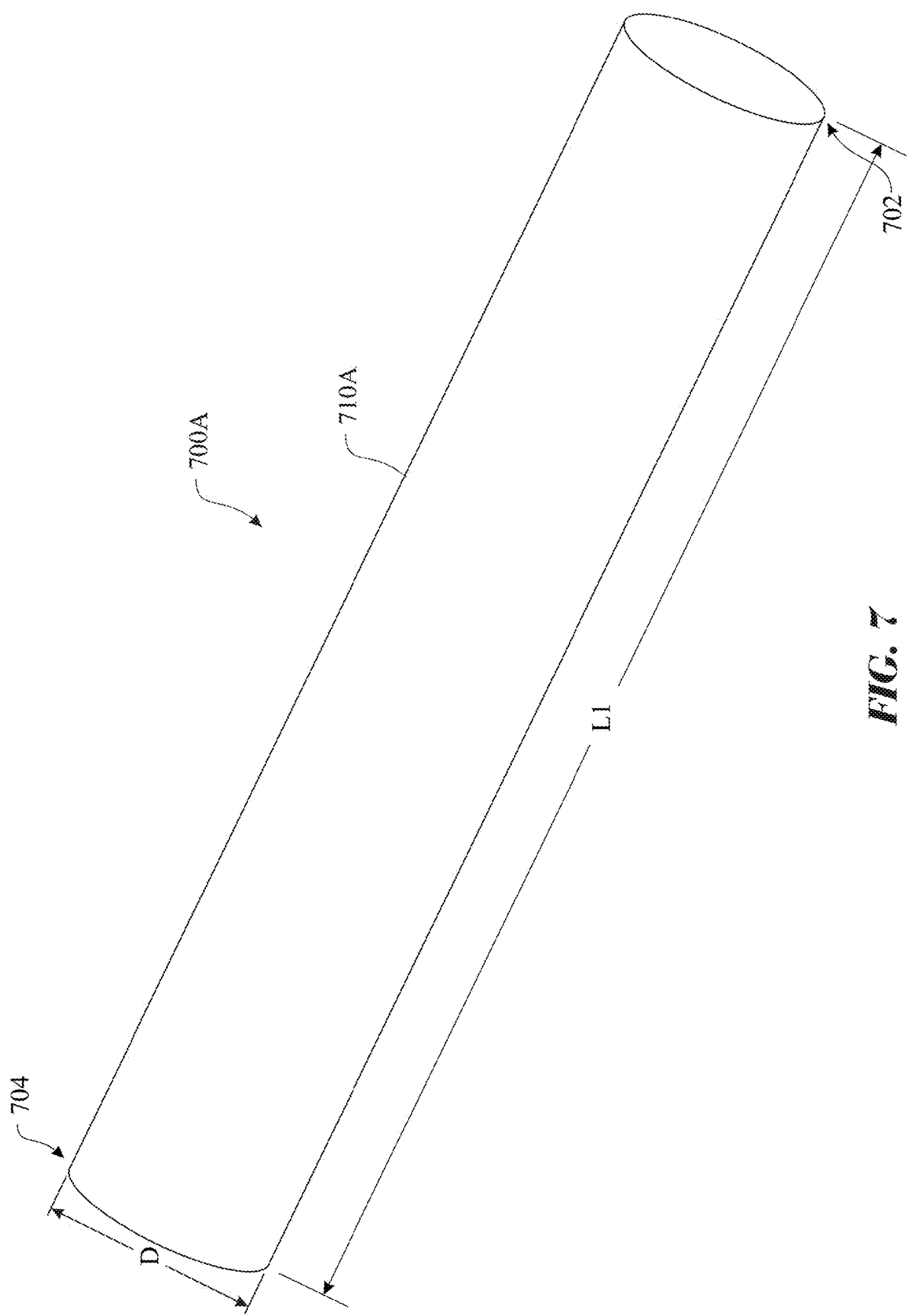
FIG. 7 presents an isometric view of a drill bit stock.

The drill bit manufacturing process 1100 requires acquisition of a cylindrical drill bit blank 700A, illustrated in FIG. 7. The exemplary cylindrical drill bit blank 700A can be fabricated of any suitable material, including: low carbon steel, high carbon steel, hardened carbon steel, tempered carbon steel, high speed steel, carbide, tungsten carbide, Polycrystalline diamond (PCD), or any other suitable material. Orientation of the cylindrical drill bit stock blank 700A can be referenced as having a free (leading) end 702 and a shank end 704.

Following machining of the cylindrical drill bit stock blank 700A, the finished constant rake planar cutting edge fluted drill bit 700 can be coated with at least one of the following: black oxide, Titanium nitride (TiN), Titanium aluminum nitride (TiAlN), Titanium carbon nitride (TiCN), Diamond powder, Zirconium nitride, Al-Chrome Silicon Nitride (AlCrSi/Ti) N, Boron-Aluminum-Magnesium (BAM) BAlMgB14, or any other suitable material.

The exemplary cylindrical drill bit stock blank 700A has a drill stock blank diameter D that is substantially close to or precisely a final diameter of the constant rake planar cutting edge fluted drill bit 700. In some manufacturing processes, the drill stock blank diameter D may be slightly larger than the final diameter of the constant rake planar cutting edge fluted drill bit 700, wherein the peripheral surface of the cylindrical drill bit stock blank 700A is machined slightly to ensure that the constant rake planar cutting edge fluted drill bit 700 is true. Additionally, the cylindrical drill bit stock blank 700A may be subjected to a machining process to introduce a slight recess in an exterior circumference of the constant rake planar cutting edge fluted drill bit 700, providing a clearance on a backside of the cylindrical drill stock blank circumferential surface 710 to avoid any excessive abrasion by the cylindrical drill stock blank circumferential surface 710 against a surface of the drilled bore or hole. The drill stock blank diameter D for the constant rake planar cutting edge fluted drill bit 700 would most commonly range from 0.002 to 3.5 in (0.051 to 88.900 mm).

Figure 8:
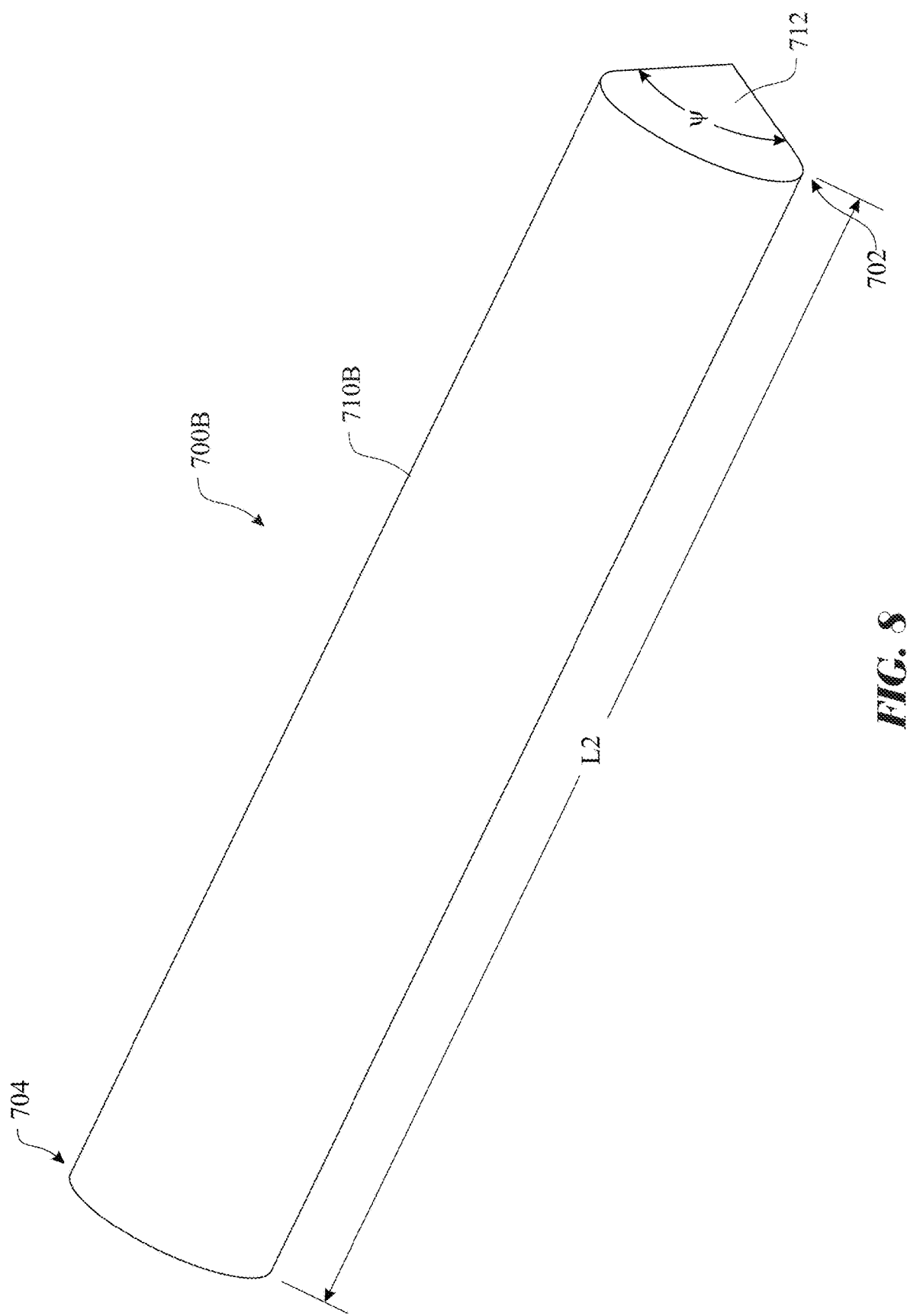
FIG. 8 presents an isometric view of a drill bit stock having a conically shaped distal cutting end formed thereon.

The exemplary cylindrical drill bit stock blank 700A is sized to a drill stock blank length L1, wherein the drill stock blank length L1 is preferably a desired length of the constant rake planar cutting edge fluted drill bit 700. The exemplary constant rake planar cutting edge fluted drill bit 700 would commonly be fabricated to have a length of up to 25.5 in (650 mm). A drill stock conically shaped end (pointed tip) 712 can be formed on a penetrating end of the cylindrical drill bit stock blank 700A, forming a cylindrical drill stock blank circumferential surface 710B (incrementing the fabrication stage of the cylindrical drill bit stock blank 700A to a conically shaped end stock blank 700B), as illustrated in FIG. 8. The formation of the drill stock conically shaped end (pointed tip) 712 reduces the length of the cylindrical drill stock blank circumferential surface 710A of the cylindrical drill bit stock blank 700A from the drill stock blank length L1 to a cylindrical drill stock blank circumferential surface 710B having a cylindrical length of conically ended stock blank L2.

The drill stock conically shaped end (pointed tip) 712 can be formed at any logical step during the process of fabricating the constant rake planar cutting edge fluted drill bit 700. In the exemplary illustration, the drill stock conically shaped end (pointed tip) 712 is formed prior to any additional machining steps for fabricating the constant rake planar cutting edge fluted drill bit 700. In an alternative process, the drill stock conically shaped end (pointed tip) 712 can be formed after all flutes are machined into the cylindrical drill bit stock blank 700A.

The drill stock conically shaped end (pointed tip) 712 can be of any desired tip angle $\psi$. The constant rake planar cutting edge fluted drill bit 700 is being designed and fabricated to cut a specific target material or group of materials. The specific target material to be cut by the constant rake planar cutting edge fluted drill bit 700 would determine the rake angle $\omega$. The rake angle $\omega$ is determined based upon the target material to be drilled. The rake angle $\omega$ is the key feature that typically determines the proper drill bit for drilling into a specific type of material. More specifically, a fast spiral with a high positive rake angle $\omega$ would be selected for softer materials and a slower spiral with a nearly neutral rake angle $\omega$ would be selected for harder materials.

Another contributor to designing the constant rake planar cutting edge fluted drill bit 700 is considerations for a common tip angle $\psi$. The most common tip angle $\psi$ would be 118 degrees. A constant rake planar cutting edge fluted drill bit 700 having a tip angle $\psi$ shaped to be 118 degrees provides a point angle for use in most universal applications. More specifically, the constant rake planar cutting edge fluted drill bit 700 having the tip angle $\psi$ shaped to 118 degrees would be acceptable for use in cutting holes into/through wood, metal, plastic, and most other materials. Although the constant rake planar cutting edge fluted drill bit 700 having a tip angle $\psi$ shaped to be 118 degrees is considered acceptable for universal use, it does not perform as well as using a twisted (helical) drill bit having a tip angle $\psi$ shaped to the optimum angle for each material. In one alternative design, the constant rake planar cutting edge fluted drill bit 700 can have a tip angle $\psi$ shaped to a more aggressive cutting angle, such as 90 degrees. The constant rake planar cutting edge fluted drill bit 700 having the tip angle $\psi$ shaped to 90 degrees would be acceptable for use in cutting holes into/through very soft plastics and other softer materials. The more aggressive cutting angle would wear rapidly in harder materials. The constant rake planar cutting edge fluted drill bit 700 having the tip angle $\psi$ shaped to 90 degrees tend to be self-starting and can cut very quickly.

In another alternative design, the constant rake planar cutting edge fluted drill bit 700 can have a tip angle $\psi$ shaped to a shallower cutting angle, such as 150 degrees. The constant rake planar cutting edge fluted drill bit 700 having the tip angle $\psi$ shaped to 150 degrees would be acceptable for use in cutting holes into/through tougher materials, such as steel and other tougher materials. The shallower cutting angle typically requires a starter hole, but does not bind or suffer premature wear so long as a suitable feed rate is used.

In yet another alternative design, the constant rake planar cutting edge fluted drill bit 700 can have any other desired tip angle $\psi$, wherein the desired tip angle $\psi$ is determined based upon the desired material to be cut. For example, in addition to the above presented angles, certain medical applications might desire a 60 degree tip angle $\psi$.

In yet another alternative design, the constant rake planar cutting edge fluted drill bit 700 can lack any tip angle $\psi$. The constant rake planar cutting edge fluted drill bit 700 lacking any tip angle $\psi$ would be used in situations where a blind, flat-bottomed hole is required. The constant rake planar cutting edge fluted drill bit 700 lacking any tip angle $\psi$ are very sensitive to changes in tip angle, and even a slight change can result in an inappropriately fast cutting drill bit that will suffer premature wear.

Figure 9:
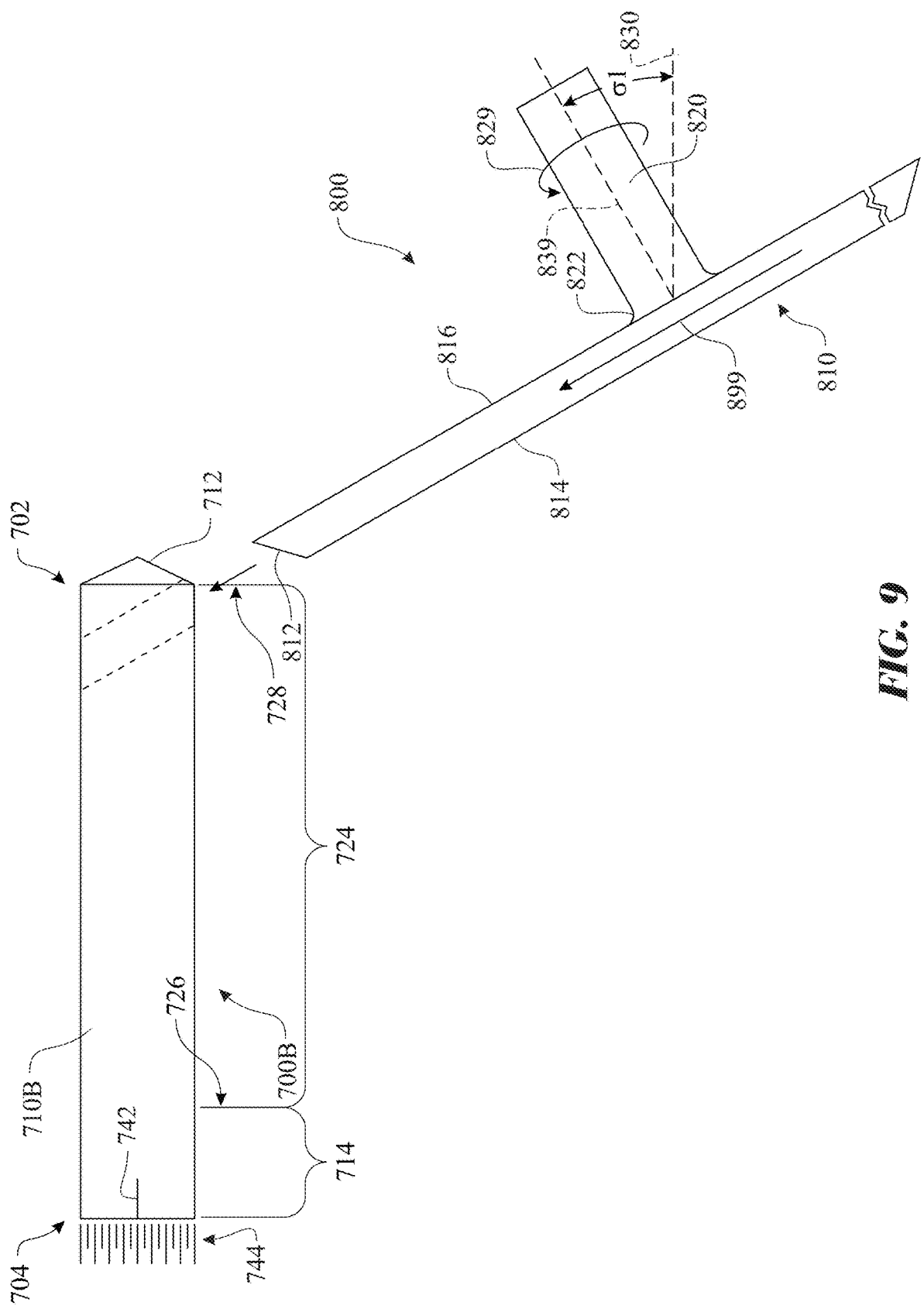
FIG. 9 presents a top plan view of a machining wheel staged for forming a planar rake section into a drill bit stock.
Figure 10:
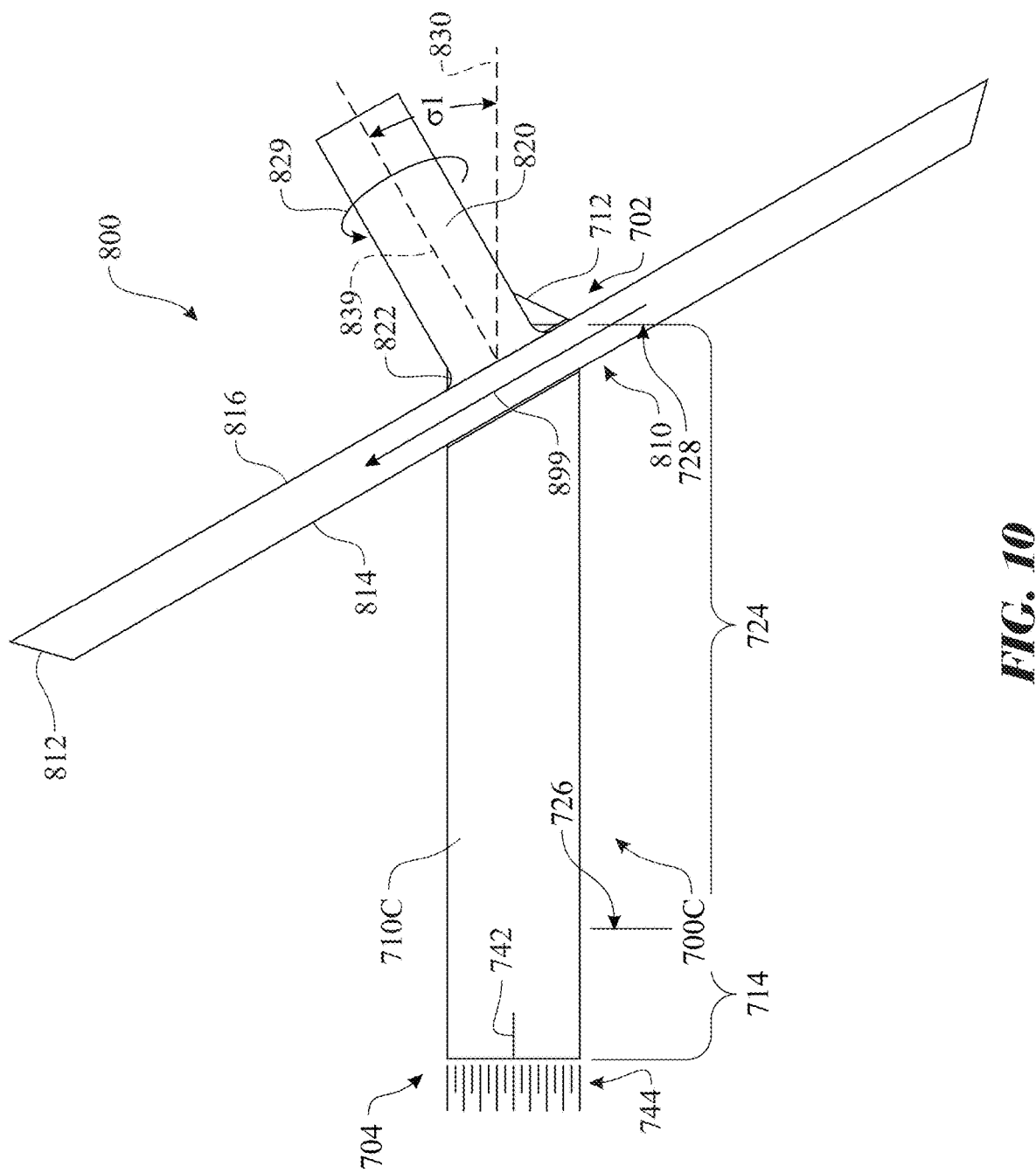
FIG. 10 presents a top plan view of the machining wheel forming the planar rake section into the drill bit stock.
Figure 11:
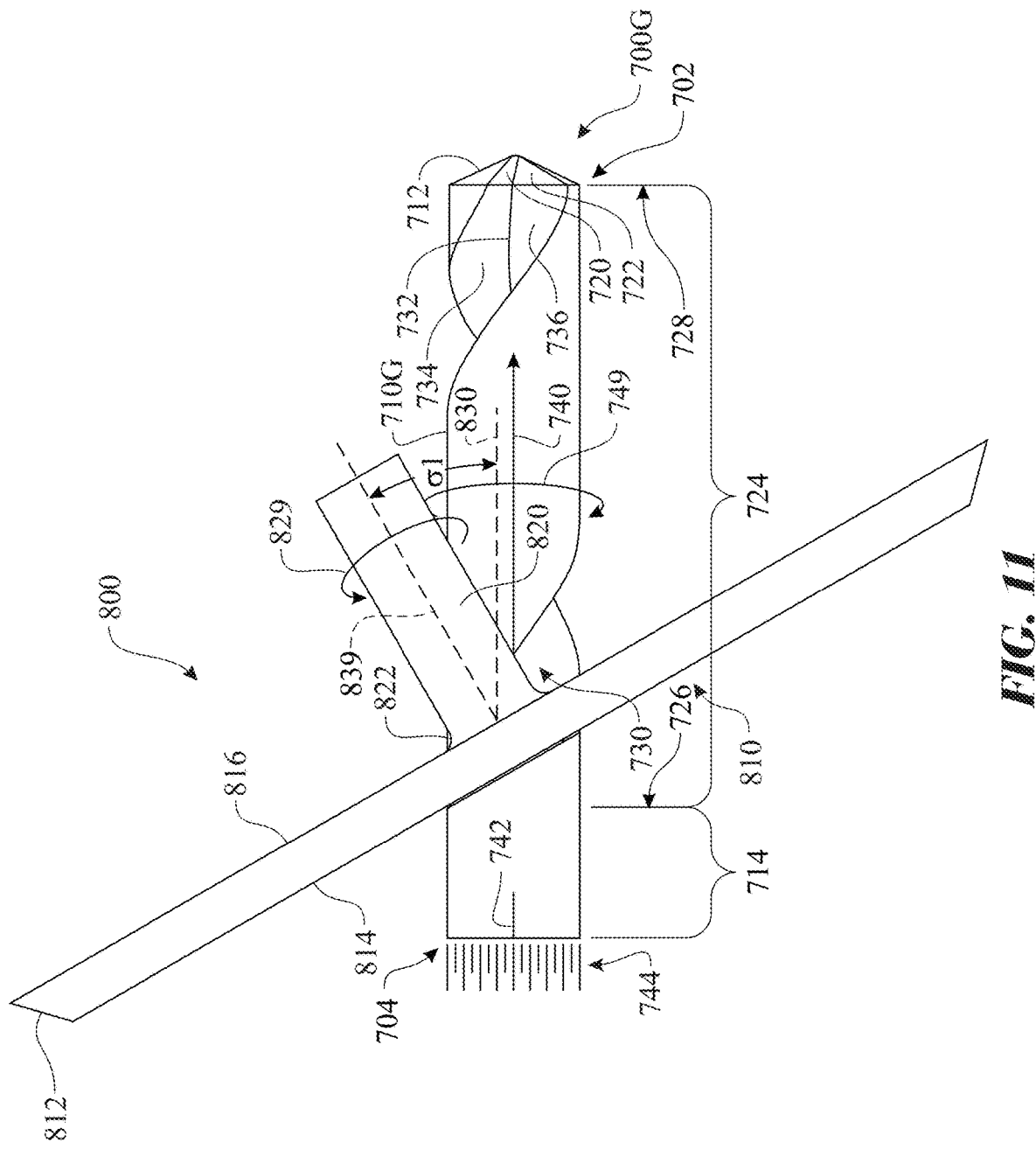
FIG. 11 presents a top plan view of the machining wheel forming the fluted section into the drill bit stock.

Steps detailing the method of fabricating the constant rake planar cutting edge fluted drill bit 700 (described in the drill bit manufacturing process 1100) are exemplified in the top view illustrations shown in FIGS. 9 through 11 and the isometric view illustrations shown in FIGS. 12 through 17. The finished constant rake planar cutting edge fluted drill bit 700 is illustrated in the various views presented in FIGS. 18 through 25. The constant rake planar cutting edge fluted drill bit 700 is identified by each step of the process by inclusion of a suffix, wherein the suffix is a letter incrementing to a next letter for each step. Steps of fabricating the constant rake planar cutting edge fluted drill bit 700 are identified by increments from a cylindrical drill bit blank 700A through a conically ended with first cutting edge formed and completed first helical flute formation stock 700G. Since each step changes a shape of the circumference of the cylindrical drill stock 700A through the conically ended with first cutting edge formed and completed first helical flute formation stock 700G, each step of the process changes the cylindrical drill stock blank circumferential surface between a cylindrical drill stock blank circumferential surface 710A and a cylindrical drill stock residual circumferential surface 710G.

A first exemplary machining wheel is a bit forming tool 800, which is introduced in an exemplary top plan view illustrated in FIGS. 9 through 11, with an exemplary isometric side view being illustrated in FIGS. 12 through 17, and a side elevation view being illustrated in FIG. 26. The exemplary bit forming tool 800 includes a bit forming tool machining wheel 810 assembled to a rotational drive member, wherein the rotational drive member rotates about a bit forming tool rotational axis 839 in accordance with a bit forming tool rotational motion 829. In the exemplary illustrations, the rotational drive member is identified as a bit forming tool arbor 820. A bit forming tool arbor fillet 822 can be provided between the bit forming tool arbor 820 and the bit forming tool machining wheel 810 to reinforce the joint between the bit forming tool arbor 820 and the bit forming tool machining wheel 810. In other variations, a bore could be formed through a central location of the bit forming tool machining wheel 810 and an arbor would be secured to the bit forming tool machining wheel 810. The bore can be reinforced or thickened to increase in a reliability between the bit forming tool machining wheel 810 and the arbor. Effectively, the rotational drive member can be any suitable rotational drive member that would drive a rotational motion of the bit forming tool machining wheel 810. The rotational drive member would be coupled directly or indirectly to a rotating motor.

The exemplary bit forming tool machining wheel 810 includes a leading side radial machining surface 814 on a side of the bit forming tool machining wheel 810 opposite the bit forming tool arbor 820, a trailing side radial machining surface 816 on a side of the bit forming tool machining wheel 810 having the bit forming tool arbor 820 extend therefrom, and a leading, linear circumferential machining surface 812 having a planar surface extending between a peripheral edge of the trailing side radial machining surface 816 and a peripheral edge of the leading side radial machining surface 814. It is preferred that the leading side radial machining surface 814 and the trailing side radial machining surface 816 are planar or slightly concave. The leading, linear circumferential machining surface 812 is preferably substantially linear between the peripheral edge of the trailing side radial machining surface 816 and the peripheral edge of the leading side radial machining surface 814.

The exemplary bit forming tool 800 is a grinding wheel; preferably a super abrasive grinding wheel. The super abrasive grinding wheel is a preferred tool for machining a constant rake planar cutting edge fluted drill bit 700 from a cylindrical drill stock blank 700A when fabricating a constant rake planar cutting edge fluted drill bit 700 from a cylindrical drill stock blank 700A of a hardened drill blank. It would be very difficult to mill hardened drill blanks using a cutting tool such as a toothed milling cutter since the hardness of the hardened drill bit blank is about the same hardness of the cutting tool.

When fabricating a constant rake planar cutting edge fluted drill bit 700 from a cylindrical drill stock blank 700A that is of a softer material, it is preferred to use a cutting wheel, as the grinding wheel would "load up", causing premature wheel failure. Drill bits 700 fabricated of the softer material are commonly heat treated after coning, fluting etc.

The exemplary bit forming tool 800 illustrated herein is in a form of the super abrasive grinding wheel. The exemplary bit forming tool 800 is referred to as a machining wheel, which is representative of either a super abrasive grinding wheel, a cutting wheel, or any other suitable machining wheel having a suitable cross sectional shape and cutting surface suitable for machining the material of the selected cylindrical drill stock blank 700A.

The drill bit manufacturing process 1100 initiates with a step of positioning a cylindrical drill stock blank 700A within a lathe or any other turning machine, a milling machine, a grinding machine, or any other machine suitable for fabricating the constant rake planar cutting edge fluted drill bit 700. The cylindrical drill stock blank 700A would have a length L1 that is substantially or equal to a desired finished length of the constant rake planar cutting edge fluted drill bit 700 and a diameter D of a cylindrical drill stock blank circumferential surface 710A that is substantially equal to or slightly larger than a desired finished diameter of the constant rake planar cutting edge fluted drill bit 700. A drill stock conically shaped end (pointed tip) 712 can be formed at a cutting end of the constant rake planar cutting edge fluted drill bit 700 either prior to a step of forming of the cutting surfaces and flutes or subsequent to the step of forming of the cutting surfaces and flutes. The drill stock conically shaped end (pointed tip) 712 can be formed by rotating the cylindrical drill stock blank 700A and machining the drill stock conically shaped end (pointed tip) 712 using any suitable machining tool, such as a grinding tool, a cutting tool, or any other suitable machining tool.

Figure 12:
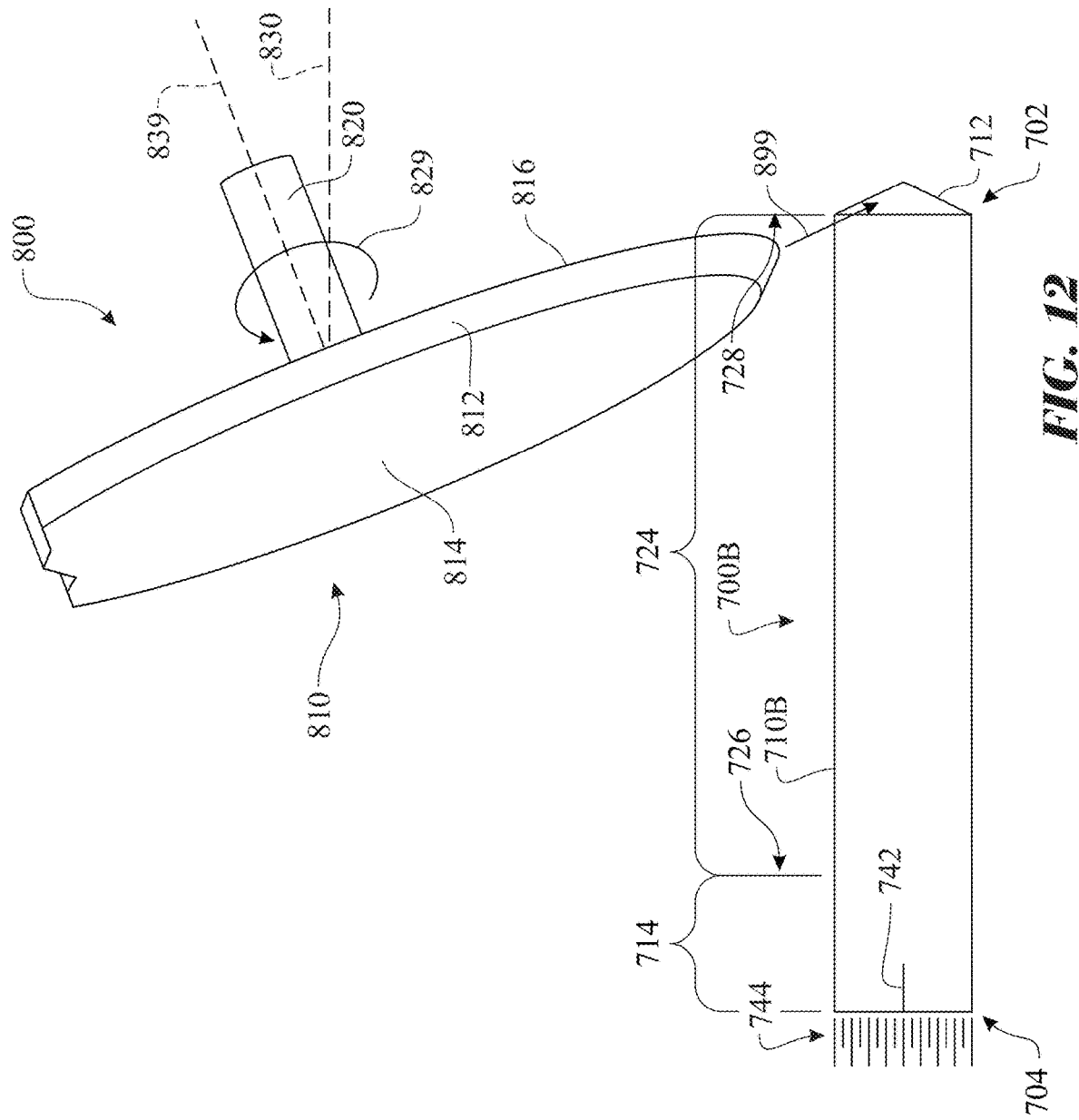
FIG. 12 presents an isometric side view of the machining wheel staged for forming a planar rake section into the drill bit stock.
Figure 13:
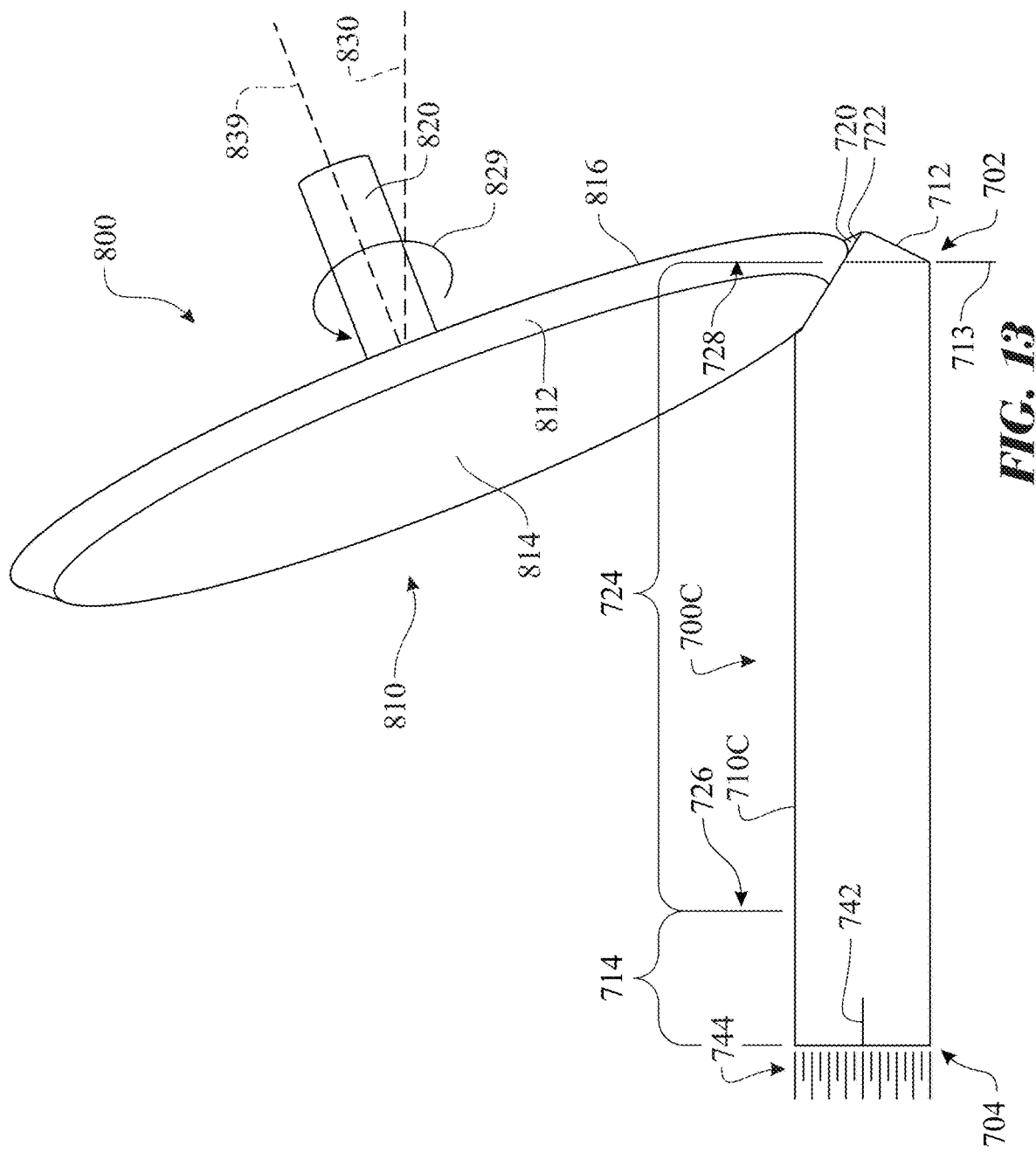
FIG. 13 presents an isometric side plan view of the machining wheel forming the planar rake section into the drill bit stock.
Figure 14:
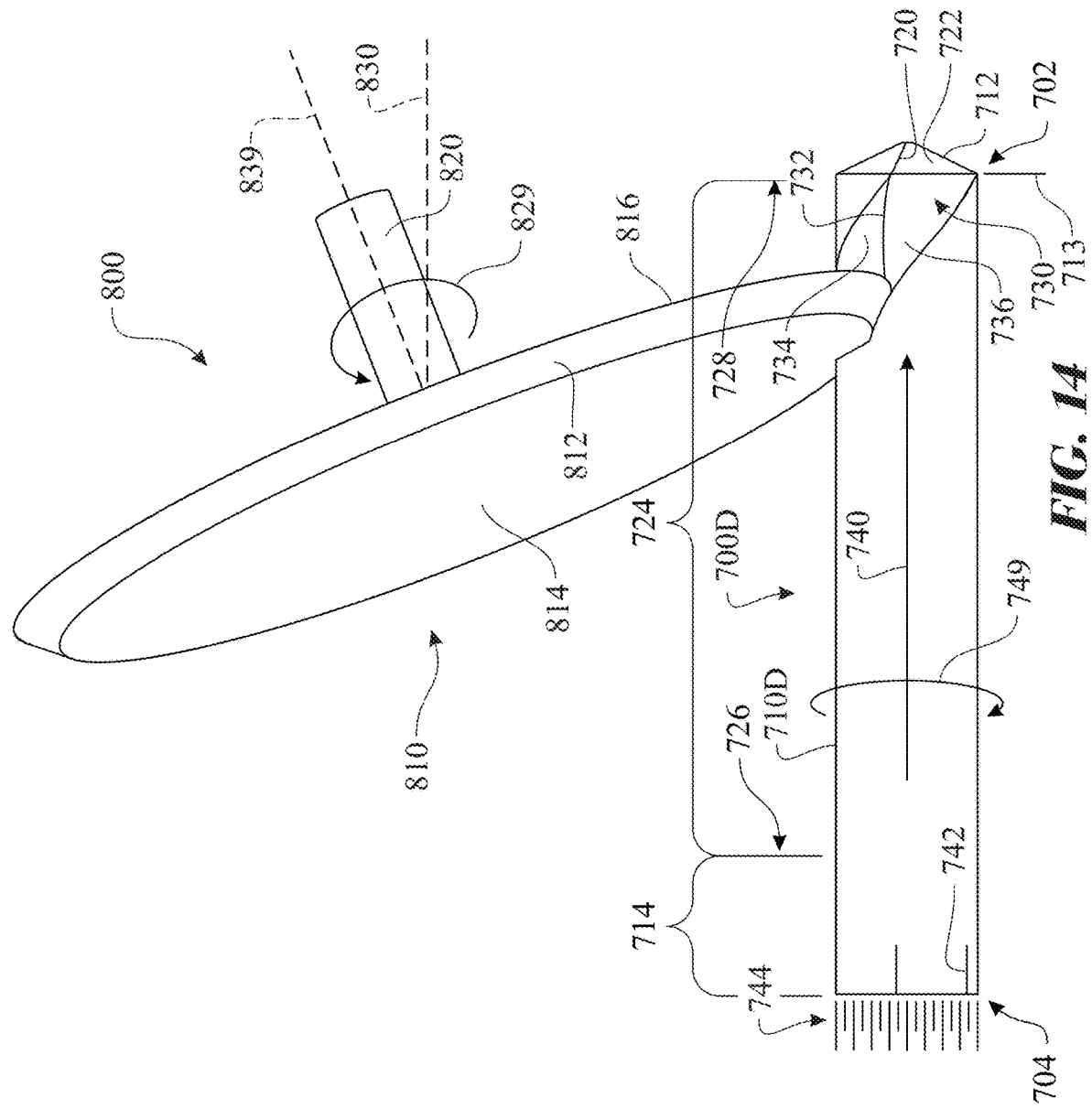
FIG. 14 presents an isometric side view of the machining wheel forming an initial portion of the fluted section into the drill bit stock.
Figure 15:
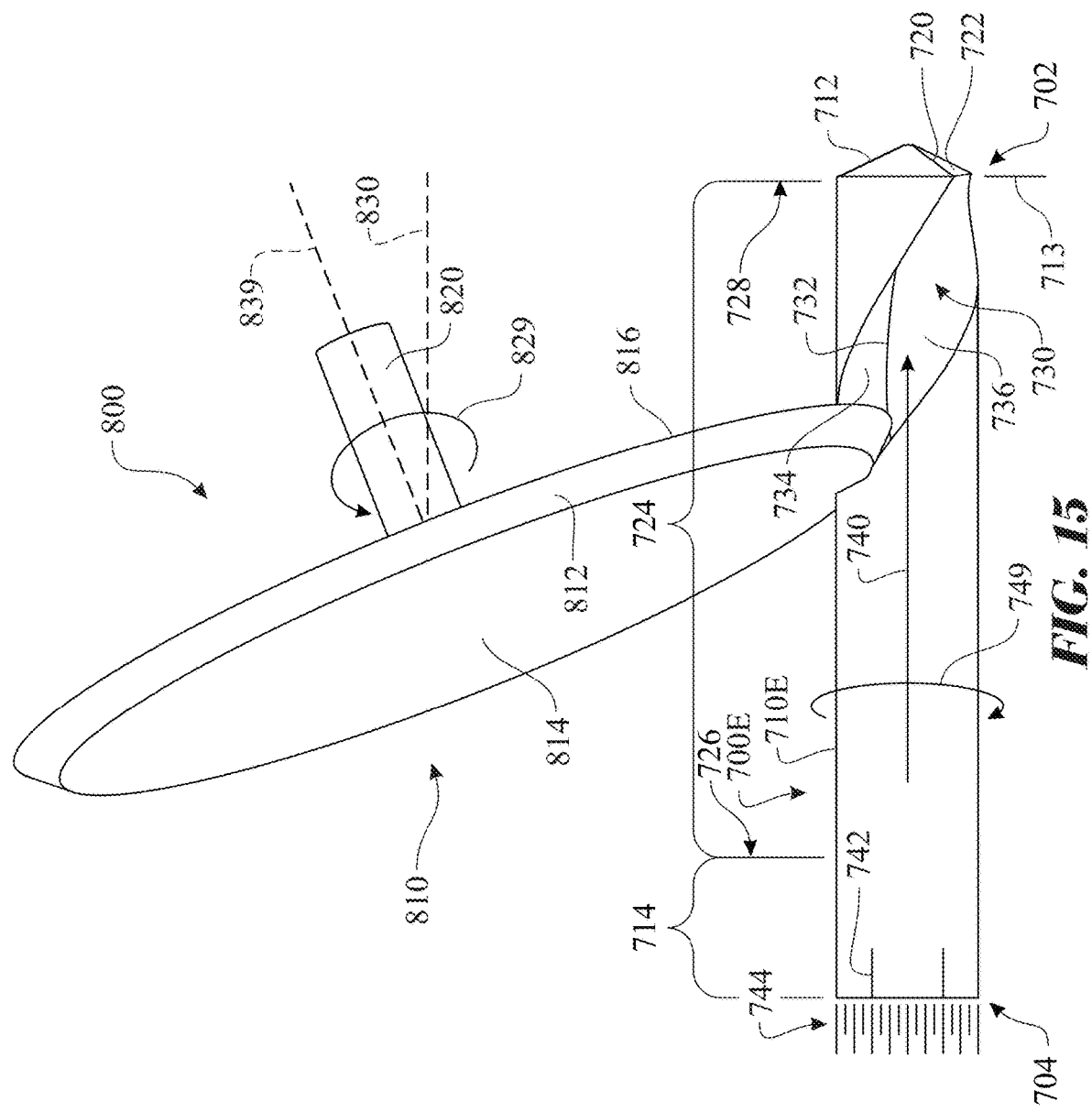
FIG. 15 presents an isometric side view of the machining wheel continuing to form a forward central portion of the fluted section into the drill bit stock.
Figure 16:
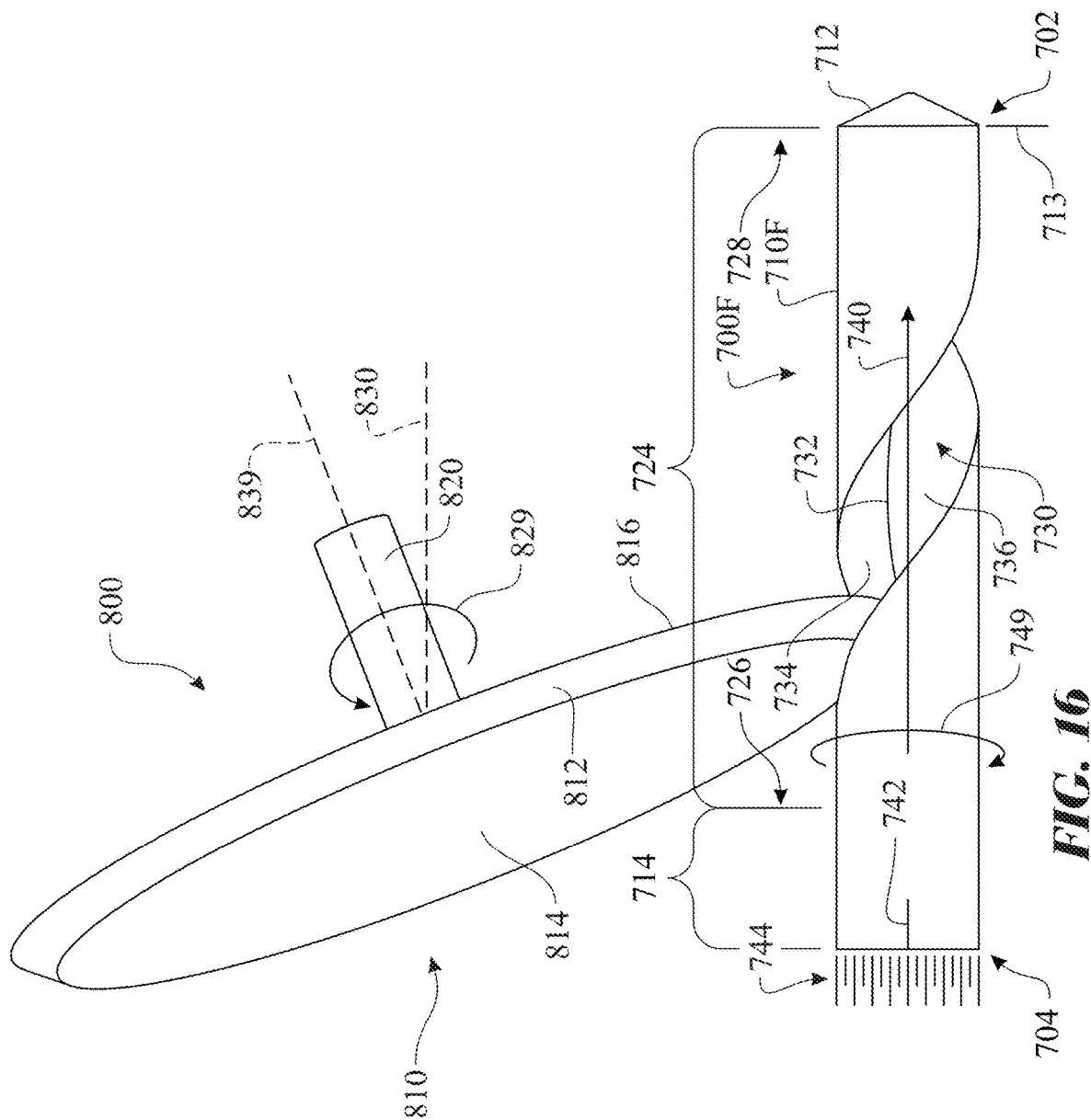
FIG. 16 presents an isometric side view of the machining wheel continuing to form a rearward central portion of the fluted section into the drill bit stock.

The exemplary process utilizes the conically shaped end stock blank 700B. The conically shaped end stock blank 700B is mounted (or remains) within the manufacturing turning machine. The conically shaped end stock blank 700B is supported in a non-rotating position (block 1110). A rotational position of the conically shaped end stock blank 700B is referenced by a bit rotational indexing marker 742 respective to a bit rotational index 744. The conically shaped end stock blank 700B and the bit forming tool 800 are aligned to complete an initial machining process forming a flat rake surface (drill bit cutting face) 720 (FIGS. 11, 14) as illustrated in FIGS. 9 and 12. The registration between the conically shaped end stock blank 700B and the bit forming tool 800 can be verified by any suitable method, including a mechanical alignment process, a visual alignment process, laser alignment process, or any other suitable alignment process. The alignment includes considerations of a helix angle ω (or a lead angle λ) and a location of the flat rake surface (drill bit cutting face) 720 respective to the drill stock conically shaped end (pointed tip) 712. The exemplary alignment is identified by a bit forming tool reference angle σ1, wherein the bit forming tool reference angle σ1 is measured between a bit stock elongated axis 830 and a bit forming tool rotational axis 839, as illustrated in FIG. 9. Rotation 829 of the bit forming tool 800 about the bit forming tool rotational axis 839 is initiated (block 1112). The bit forming tool 800 and the conically shaped end stock blank 700B are brought together along a bit forming tool linear motion 899 by moving at least one of the bit forming tool 800 and the conically shaped end stock blank 700B along the bit forming tool linear motion 899 (block 1114). The rotational motion 829 of the bit forming tool 800 removes material from the conically shaped end stock blank 700B creating the flat rake surface (drill bit cutting face) 720 and a planar relief surface section 722 (FIGS. 11, 14) in the drill stock conically shaped end (pointed tip) 712 as illustrated in FIGS. 10 and 13 (block 1120). The flat rake surface (drill bit cutting face) 720 and the planar relief surface section 722 are planar, as the conically shaped end stock blank 700B remains stationary during this machining step. A shape, angle and size of the flat rake surface (drill bit cutting face) 720 and the planar relief surface section 722 can be determined by an initial angle of the bit forming tool linear motion 899 and a shape of the bit forming tool machining wheel 810. Once the flat rake surface (drill bit cutting face) 720 and the planar relief surface section 722 are formed, the manufacturing turning machine can initiate a linear motion 740 of the conically ended with cutting edge formed stock 700C (step 1122). A rotational motion 749 of the conically ended with cutting edge formed stock 700C can be initiated (block 1124). The rotational motion 749 can initiate simultaneously with the initiation of the linear motion 740 or slightly after the initiation of the linear motion 740. The timing of the initiation of the rotational motion 749 of the conically ended with cutting edge formed stock 700C respective to the initiation of the linear motion 740 is determined to ensure that the flat rake surface (drill bit cutting face) 720 and the planar relief surface section 722 remain planar (creating a demarcation/transition between the flat rake surface (drill bit cutting face) 720 and the first helical flute formation 730 identified as a planar cutting surface demarcation 713). The bit forming tool 800 would continue to rotate in a stationary position. A combination of the linear motion 740 and the rotational motion 749 of the conically ended with cutting edge formed stock 700C positions the conically ended with cutting edge formed stock 700C respective to the rotating bit forming tool 800 to form the first helical flute formation 730 as illustrated in FIGS. 11 and 14 through 16 (block 1126). The combination of the rotational and linear motion creates a helical flute extending along a length of a section of the constant rake planar cutting edge fluted drill bit 700 that is referred to as a cylindrical helical flute section 724. Orientation of the cylindrical helical flute section 724 can be defined by each end, wherein a cylindrical helical flute section leading end 728 is located at an end of the cylindrical helical flute section 724 adjacent to the free (leading) end 702, and a cylindrical helical flute section shank end 726 is located at an end of the helical flute section 724 adjacent to the shank end 704.

Figure 17:
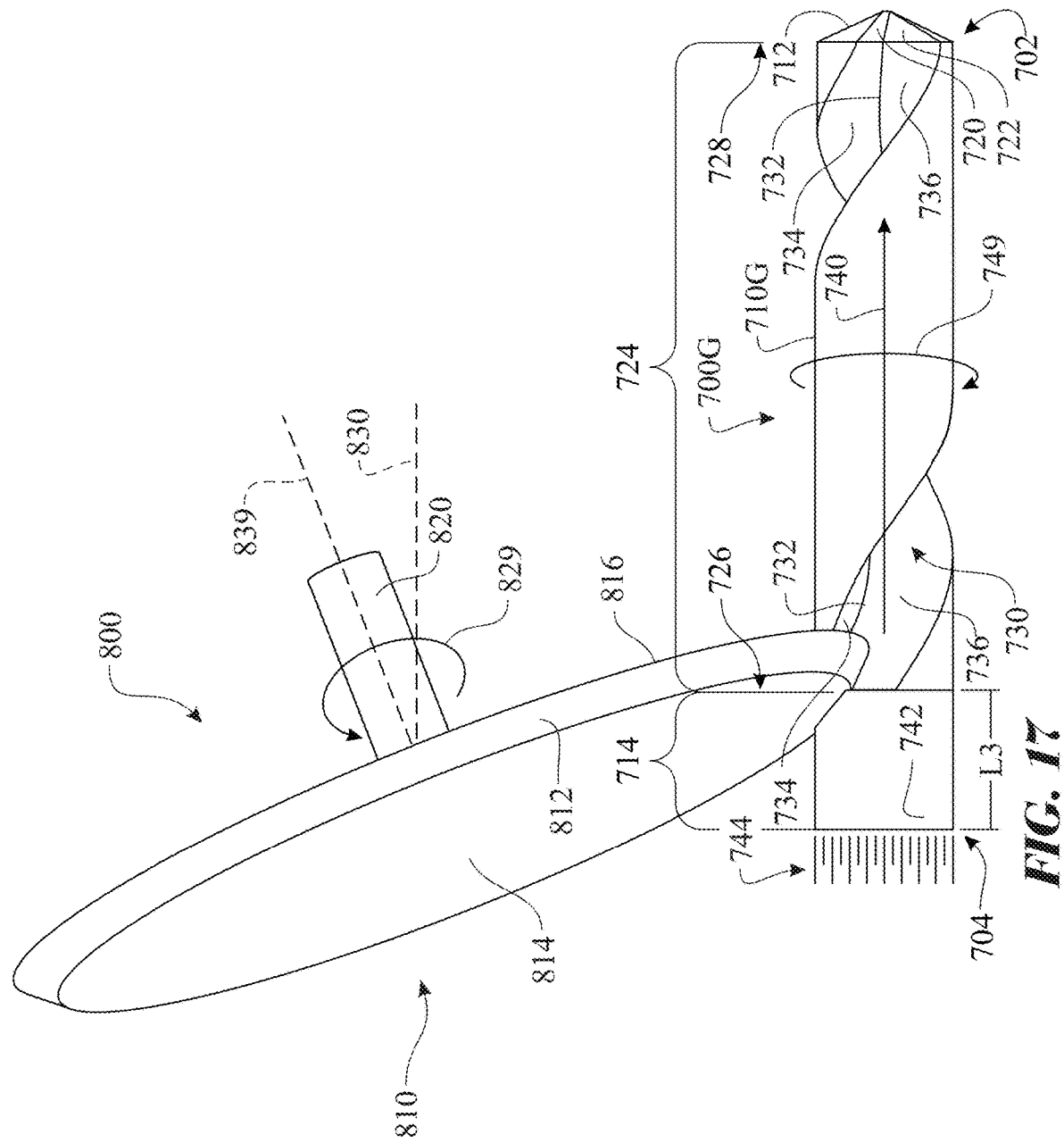
FIG. 17 presents an isometric side view of the machining wheel at a final step of forming the fluted section into the drill bit stock.

The process continues until the bit forming tool 800 is at a position defining a drill bit shank section 714, as illustrated in FIG. 17 (block 1126), leaving a length L3 (bit shank cylindrical length L3) of the original drill stock. The cross sectional shape of the bit forming tool 800 forms a first flute crease 732 demarcating the first helical flute formation 730 into a first flute material collection surface 734 and a first flute clearance surface 736. Upon completion of the first helical flute formation 730, a decision step determines if the desired number of flutes 730, 730n are formed in the conically shaped end stock blank 700B (decision block 1130). In a condition where the number of formed flutes 700, 700n is less than the desired number of flutes 730, 730n, the conically ended with first cutting edge formed and completed first helical flute formation stock 700G is rotated by an angle of 360 degrees/the desired number of flutes 730, 730n (block 1132). In the illustrated example, the constant rake planar cutting edge fluted drill bit 700 is designed to have two (2) flutes 730, 730n; therefore, the conically ended with first cutting edge formed and completed first helical flute formation stock 700G is rotated by an angle of 180 degrees and steps 1110 through 1130 are repeated (block 1134).

Figure 18:
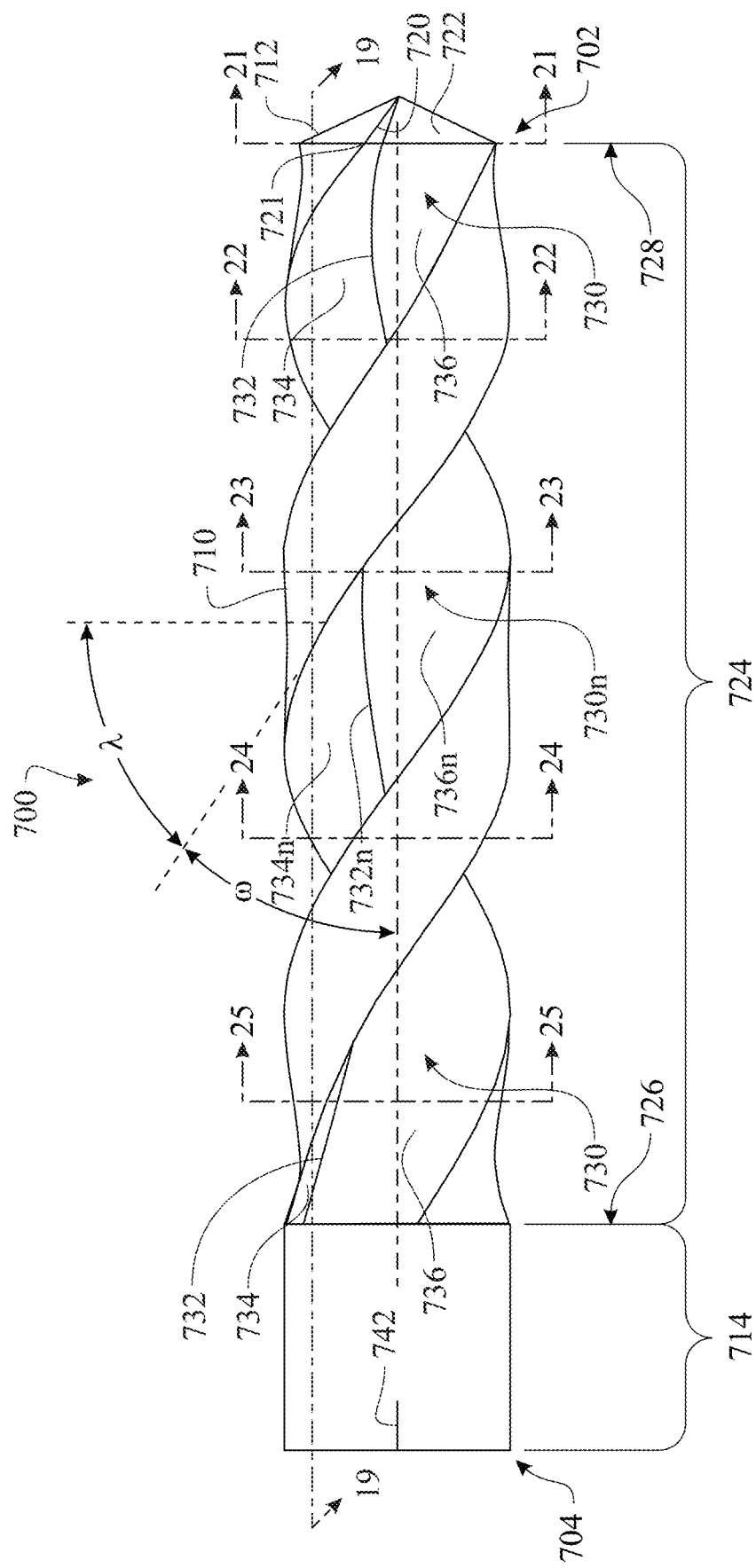
FIG. 18 presents a side elevation view of an exemplary completed constant rake fluted drill bit.
Figure 19:
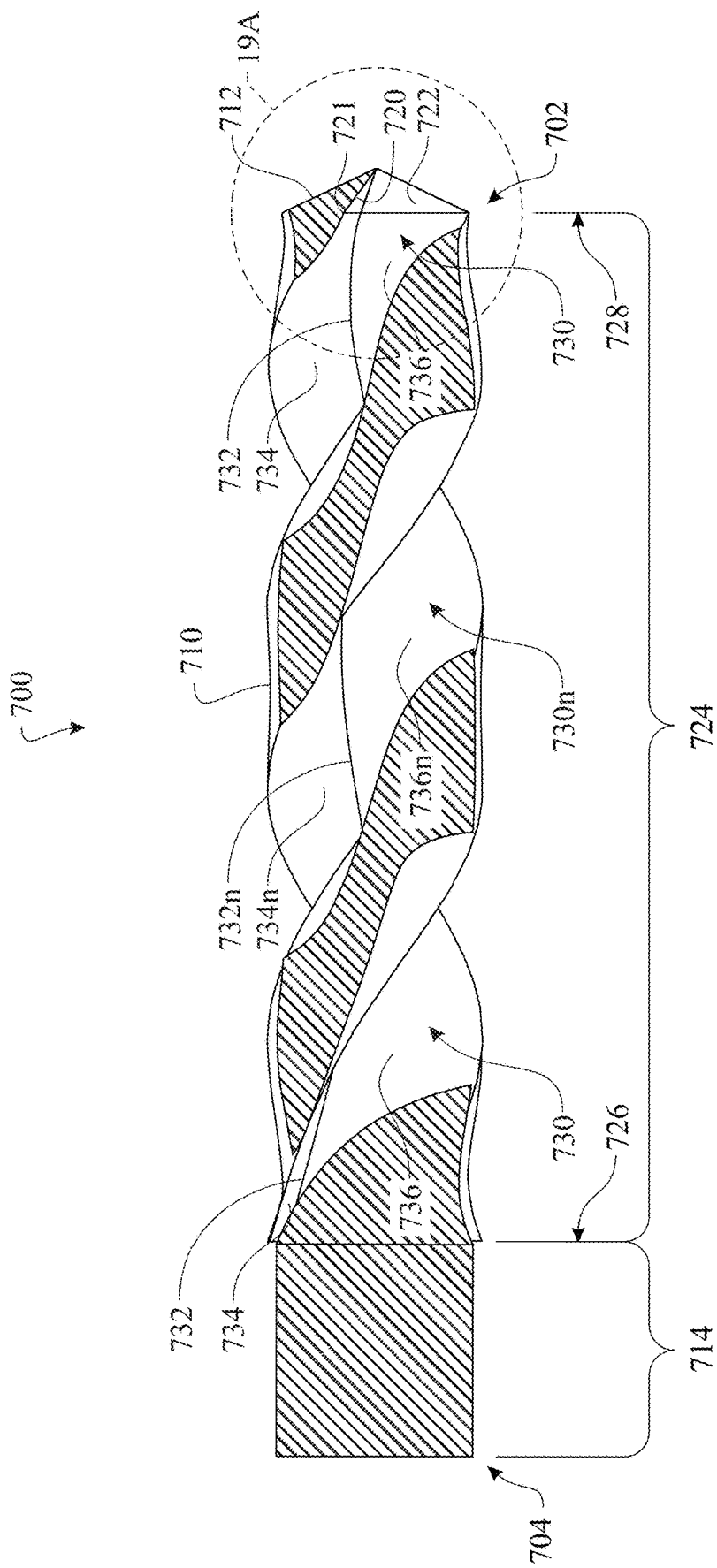
FIG. 19 presents a sectioned side elevation view of the exemplary completed constant rake fluted drill bit originally illustrated in FIG. 18, the section being taken along section line 19-19 of FIG. 18.
Figure 19A:
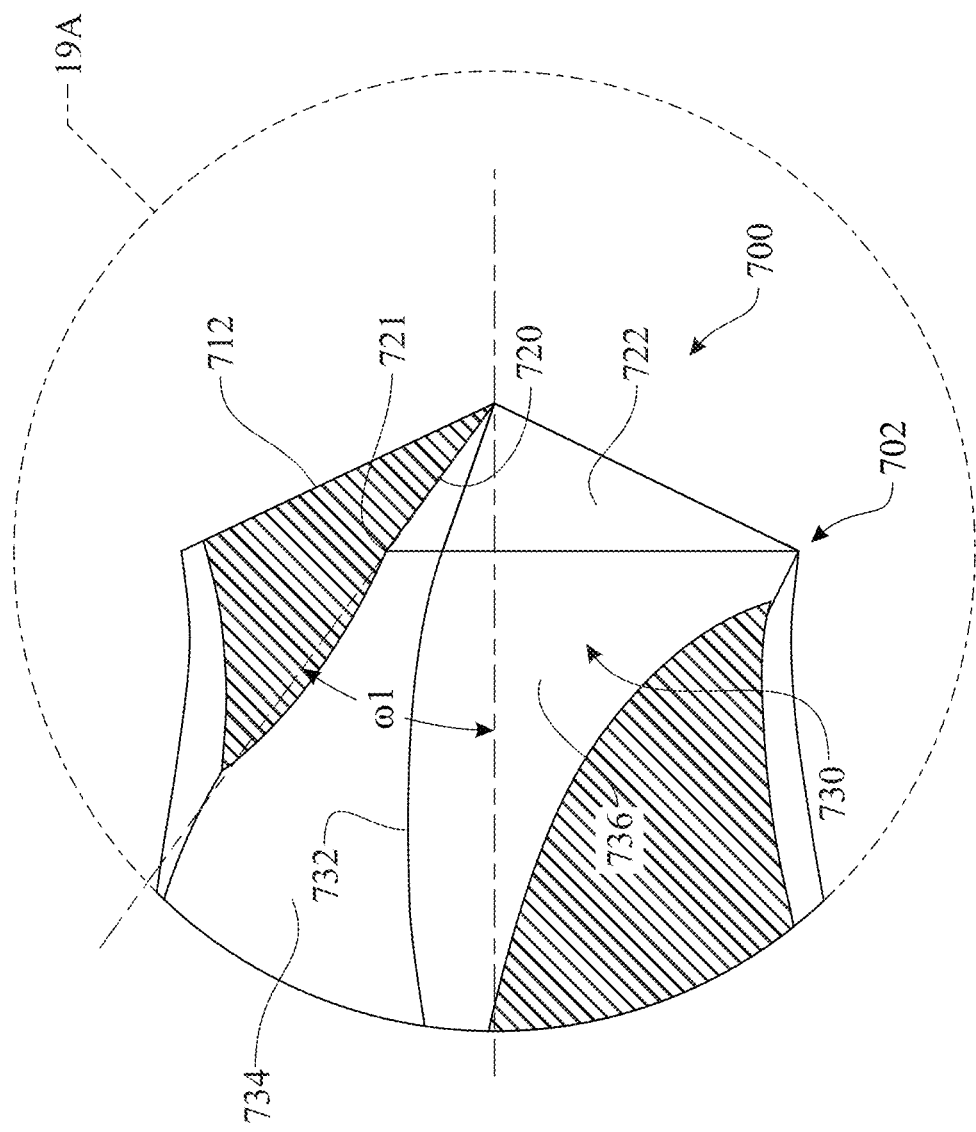
FIG. 19A presents an enlarged sectioned side elevation view of a tip of the exemplary completed constant rake fluted drill bit originally illustrated in FIG. 18, the enlarged section being within section 19A of FIG. 19.
Figure 20:
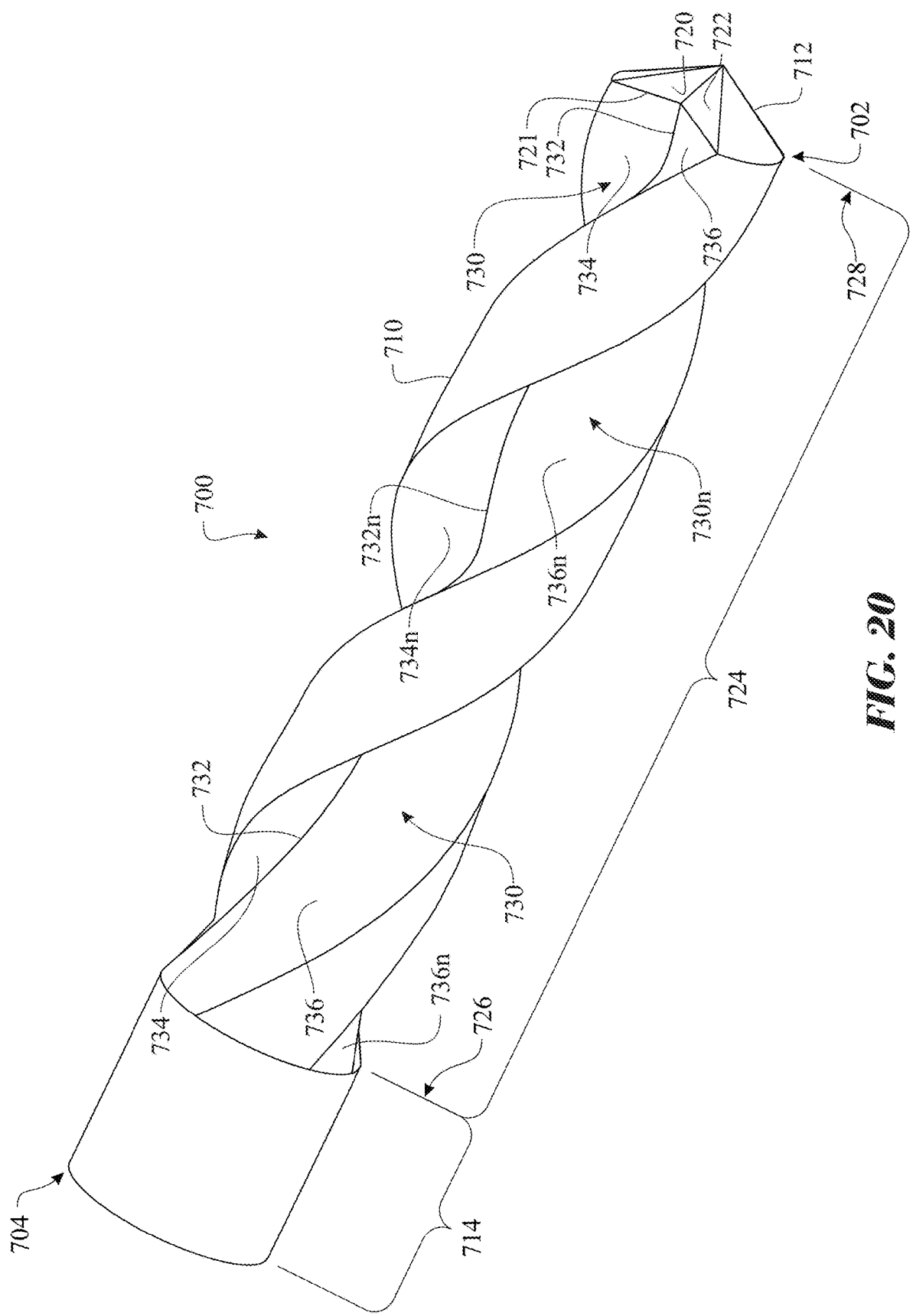
FIG. 20 presents an isometric side view of the exemplary completed constant rake fluted drill bit originally illustrated in FIG. 18.
Figure 21:
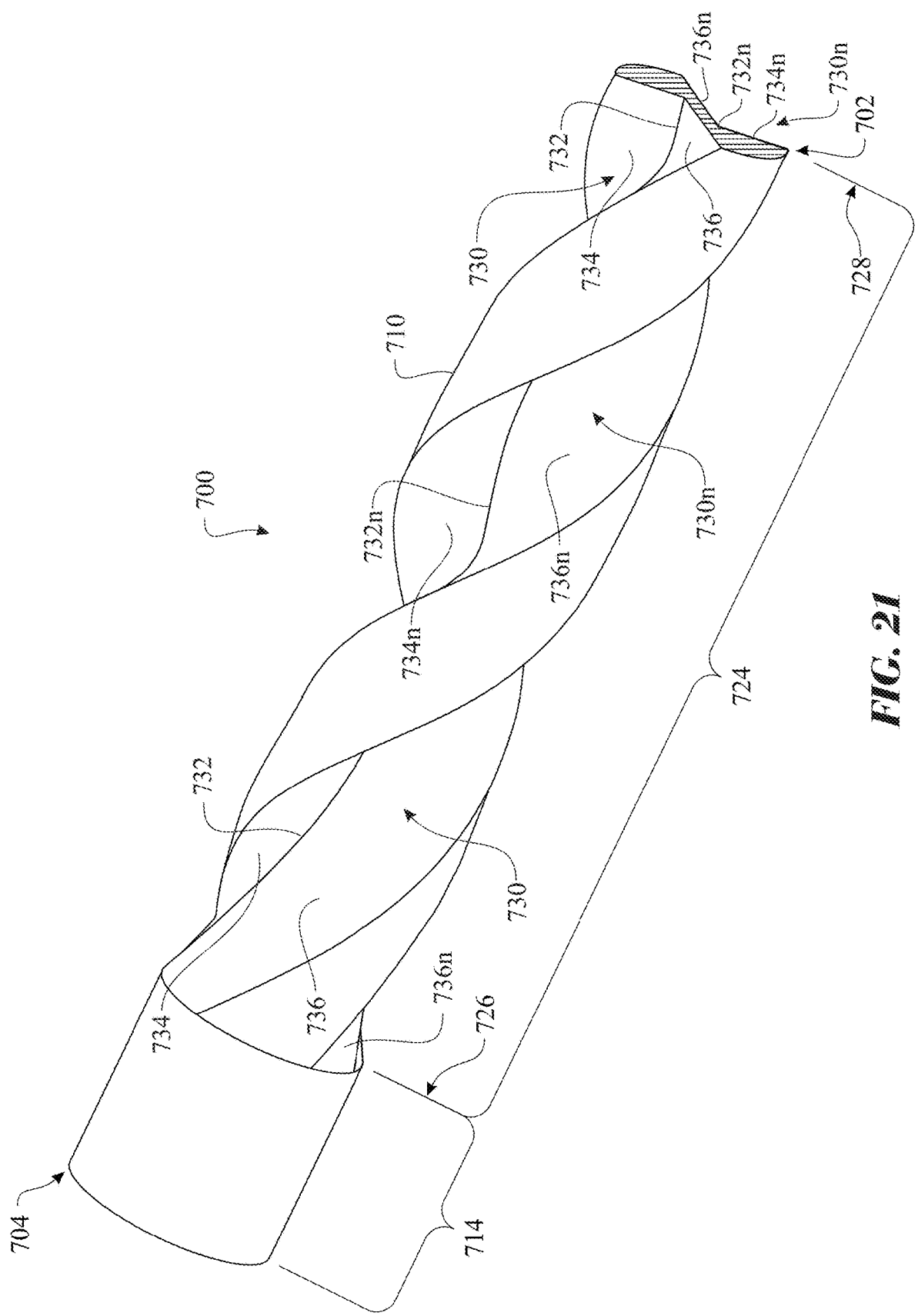
FIG. 21 presents a sectioned isometric side view of the exemplary completed constant rake fluted drill bit originally illustrated in FIG. 18, the section being taken along section line 21-21 of FIG. 18.
Figure 22:
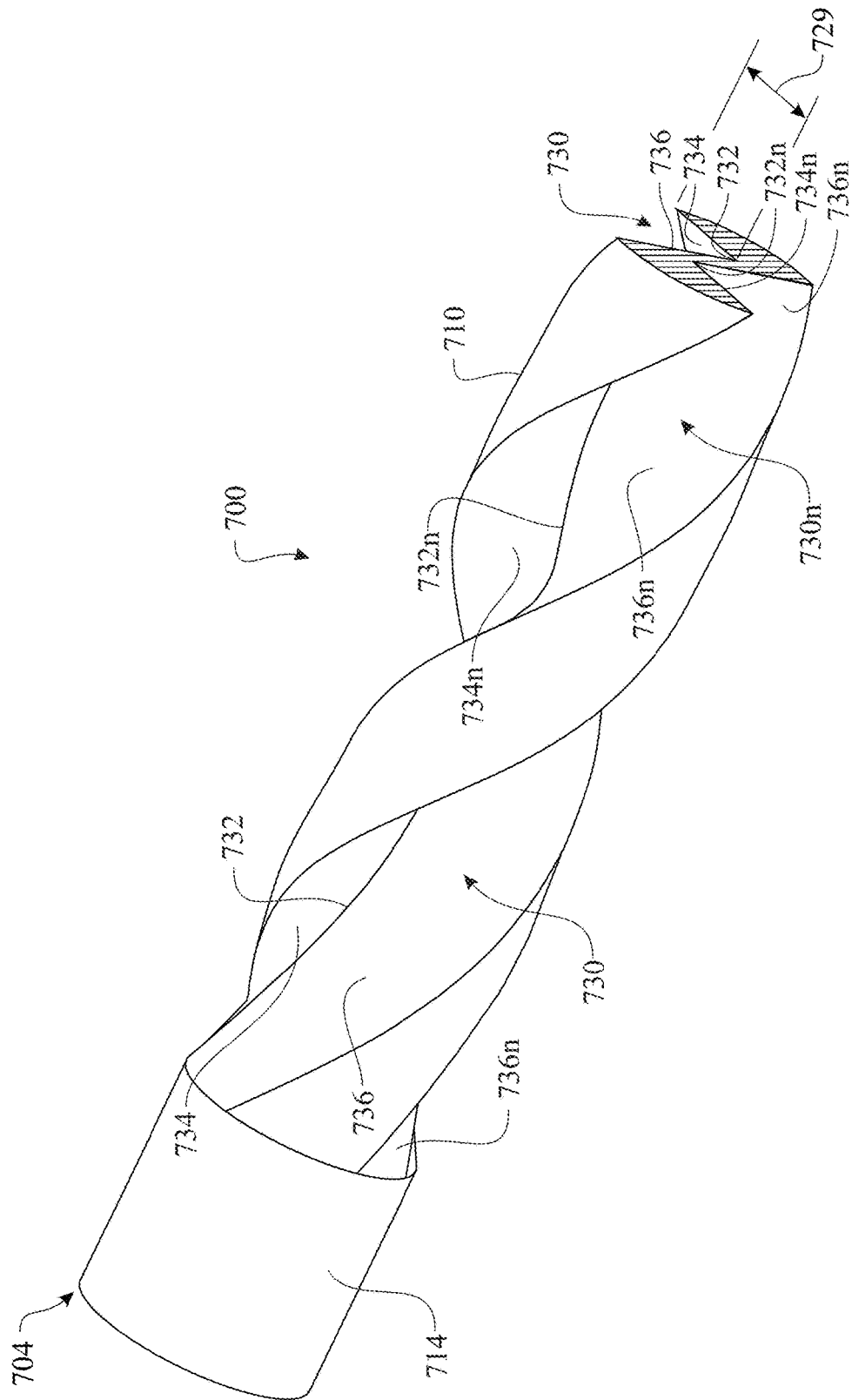
FIG. 22 presents a sectioned isometric side view of the exemplary completed constant rake fluted drill bit originally illustrated in FIG. 18, the section being taken along section line 22-22 of FIG. 18.
Figure 23:
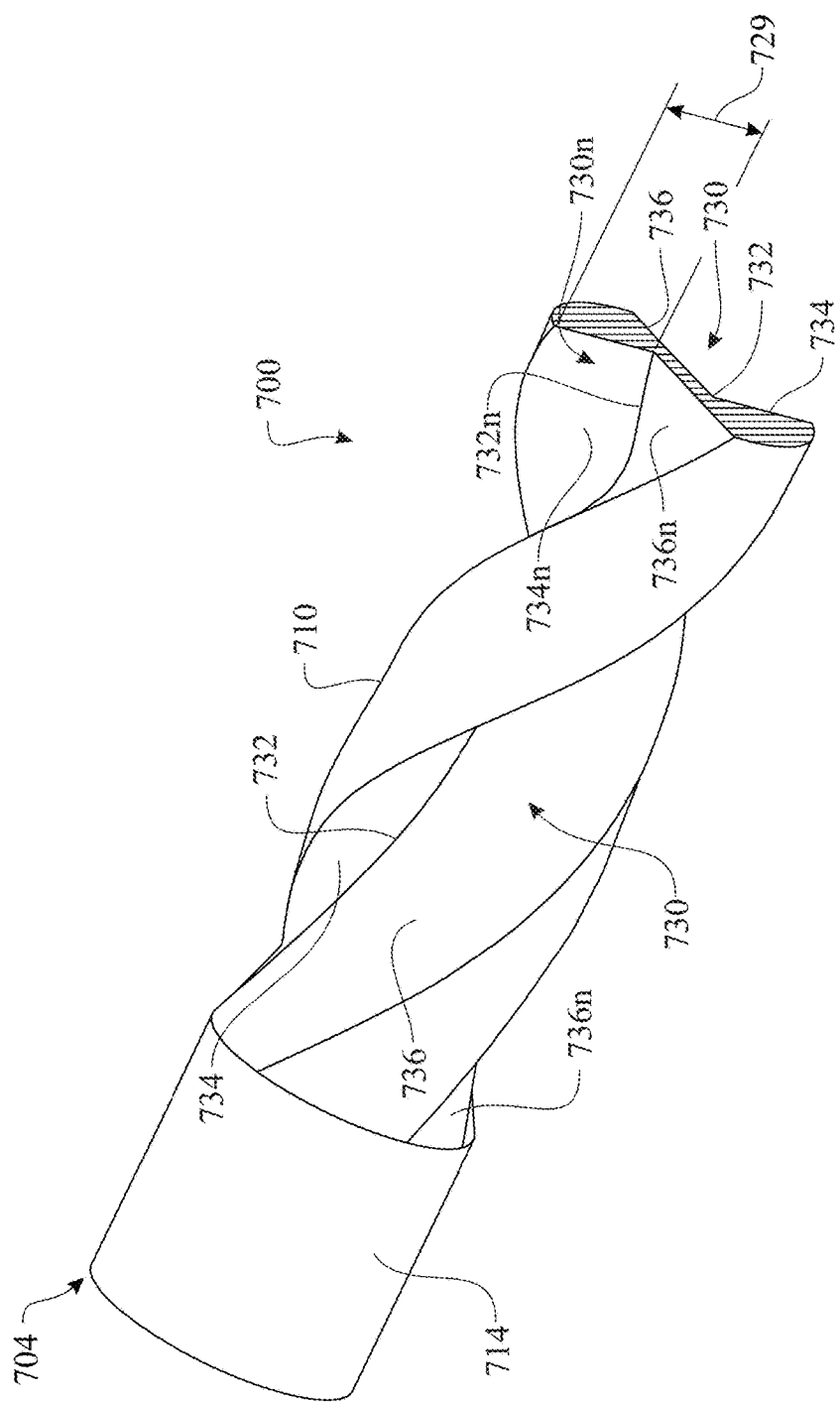
FIG. 23 presents a sectioned isometric side view of the exemplary completed constant rake fluted drill bit originally illustrated in FIG. 18, the section being taken along section line 23-23 of FIG. 18.
Figure 24:
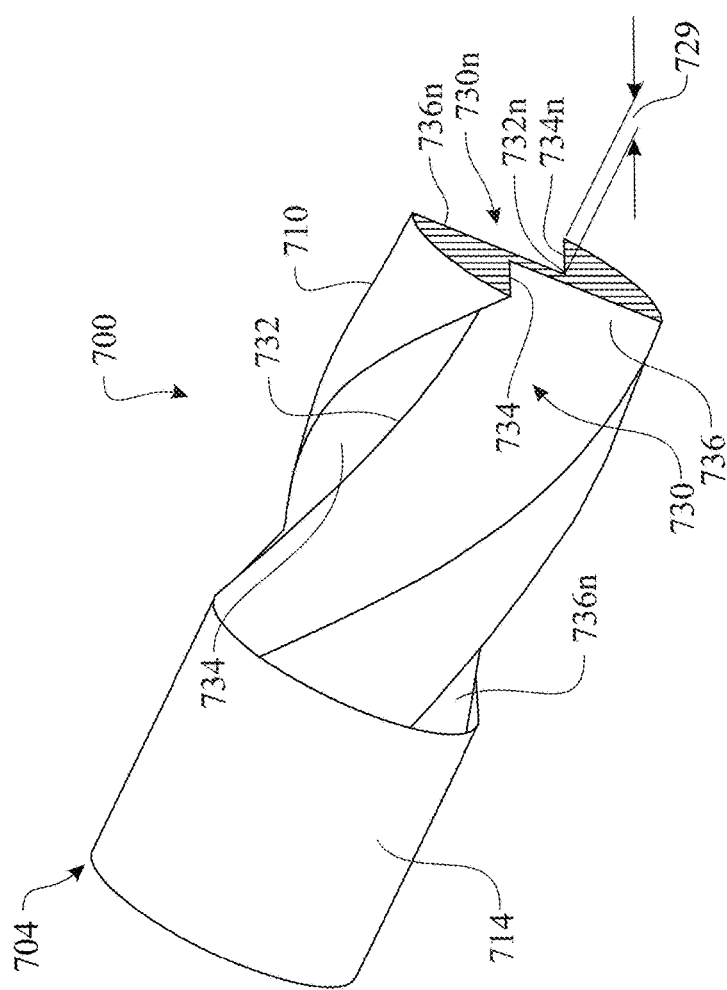
FIG. 24 presents a sectioned isometric side view of the exemplary completed constant rake fluted drill bit originally illustrated in FIG. 18, the section being taken along section line 24-24 of FIG. 18.
Figure 25:
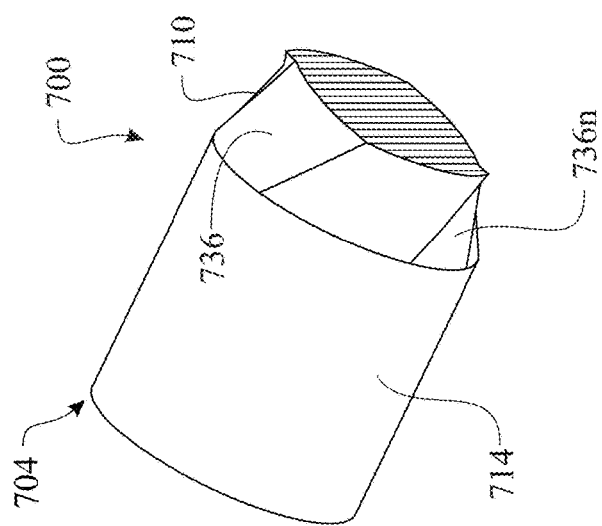
FIG. 25 presents a sectioned isometric side view of the exemplary completed constant rake fluted drill bit originally illustrated in FIG. 18, the section being taken along section line 25-25 of FIG. 18.

Upon completion of each subsequent nth flute formation 730n, the decision step determines if the desired number of flutes 730, 730n are formed in the conically shaped end stock blank 700B (decision block 1130). In a condition where the number of formed flutes 700, 700n is equal to the desired number of flutes 730, 730n, the process terminates (block 1140) and machining of the constant rake planar cutting edge fluted drill bit 700 is completed. Various views of the constant rake planar cutting edge fluted drill bit 700 are shown in FIGS. 18 through 25 to best present the various features of the constant rake planar cutting edge fluted drill bit 700. An elevation side view of the constant rake planar cutting edge fluted drill bit 700 is illustrated in FIG. 18, with a partial section view (taken along section line 19-19 of FIG. 18) being illustrated in FIG. 19. The sectioned illustration presented in FIG. 19 and the enlarged view illustrated in FIG. 19A shows the bit cutting edge-flute demarcation 721 created between the planar surface of the flat rake surface (drill bit cutting face) 720 and the arched surface of the first flute material collection surface 734. Similarly, the illustrations presented in FIGS. 19 and 19A show the demarcation between the planar surface of the planar relief surface section 722 and the arched surface of the first flute clearance surface 736. The illustration presented in FIG. 20 shows the first flute crease 732 created between the compound curvature of the first flute material collection surface 734 and the compound curvature of the first flute clearance surface 736. A degree of sharpness of the first flute crease 732 is based upon a shape of the transition between the trailing side radial machining surface 816 and the leading, linear circumferential machining surface 812. The sharper a right angle between the trailing side radial machining surface 816 and the leading, linear circumferential machining surface 812, the quicker the wear of the transition between the trailing side radial machining surface 816 and the leading, linear circumferential machining surface 812.

The enlarged view illustrated in FIG. 19A is presented to clearly describe a rake angle σ1 and distinguish a demarcation 721 between the rake angle σ1 and the helix angle ω. The rake angle ψ1 of the constant rake planar cutting edge fluted drill bit 700 is defined as an angle between a cutting edge of the flat rake surface (drill bit cutting face) 720 and the elongated centerline of the constant rake planar cutting edge fluted drill bit 700. The rake angle σ1 and planar cutting edge of the cutting face 720 is a result of the manufacturing process described herein. The rake angle ω1 is determined by the target material to be drilled. The rake angle ω1 is the key feature that typically determines the proper drill bit for drilling into a specific type of material. More specifically, a fast spiral with a high positive rake angle ω1 would be selected for softer materials and a slower spiral with a nearly neutral rake angle ω1 would be selected for harder materials. It is desirous to have a design of the constant rake planar cutting edge fluted drill bit 700 where the rake angle ψ1 is as close to the helical angle ω as possible, which strives to generate smooth chip flow.

The sectioned illustrations presented in FIGS. 21 through 25 illustrate a cross sectional shape of the constant rake planar cutting edge fluted drill bit 700 along a length of the flutes. The exemplary constant rake planar cutting edge fluted drill bit 700 includes two (2) flutes. Each flute includes a flute material collection surface 734, 734n and a flute clearance surface 736, 736n defining a flute crease 732, 732n therebetween. Each of the flute material collection surface 734, 734n and a flute clearance surface 736, 736n are linear in a radial direction, compared to the flute material collection surface 134, 134n and a flute clearance surface 136, 136n, which are curved (having a concave arch) in the radial direction.

The bit forming tool 800, as illustrated in FIG. 26, is one example of a grinding wheel capable of forming the constant rake planar cutting edge fluted drill bit 700. A bit forming tool 900, illustrated in FIG. 27, is a second exemplary grinding wheel capable of forming the constant rake planar cutting edge fluted drill bit 700. A majority of the elements of the bit forming tool 900 and the bit forming tool 800 are alike. Like elements of the bit forming tool 900 and the bit forming tool 800 are numbered the same with the elements of the bit forming tool 900 being preceded by numeral "9". The distinction between the bit forming tool 800 and the elements of the bit forming tool 900 is the shape of the leading, convex circumferential machining surface 912 extending between a leading side radial machining surface 914 and a trailing side radial machining surface 916. The leading circumferential machining surface 812 has a linear shape. The leading circumferential machining surface 912 has a convex arch shape. The convex arch shape of the leading, convex circumferential machining surface 912 can be semi-circular in shape, elliptical in shape, or any other arched shape. The leading side radial machining surface 814, 914 is bound by a first peripheral edge 811, 911. The trailing side radial machining surface 816, 916 is bound by and a second peripheral edge 813, 913. The first peripheral edge 811, 911 defining a smaller, leading diameter identified as a first peripheral edge diameter 831, 931, and the second peripheral edge 813, 913 defining a larger diameter identified as a second peripheral edge diameter 833, 933. The leading circumferential machining surface 812, 912 extends between the first peripheral edge 811, 911 and the second peripheral edge 813, 913. The difference in diameters 831, 833 defines an angle of the leading circumferential machining surface 812.

In an alternative design, the bit forming tool 900 can have a leading, convex circumferential machining surface 912 that is shaped having a linear portion and an arched portion. The leading circumferential machining surface 912 is formed having a convex curve extending between edges 911, 913.

A bit forming tool 1000, illustrated in FIG. 28, is a third exemplary grinding wheel capable of forming the constant rake planar cutting edge fluted drill bit 700. A majority of the elements of the bit forming tool 1000 and the bit forming tool 800 are alike. Like elements of the bit forming tool 1000 and the bit forming tool 800 are numbered the same with the elements of the bit forming tool 1000 being preceded by numeral "10". Similar to the bit forming tool 800, the exemplary bit forming tool 1000 includes a leading circumferential machining surface 1012 extending between a larger, central peripheral edge 1017 (having a larger diameter 1037) of the bit forming tool machining wheel 1010 and a peripheral edge 1011 (having a smaller diameter 1031) of a leading side radial machining surface 1014. The exemplary bit forming tool 1000 introduces a trailing circumferential machining surface 1015 extending between the larger, central peripheral edge 1017 (having the larger diameter 1037) of the bit forming tool machining wheel 1010 and a peripheral edge 1013 (having a smaller diameter 1033) of a trailing side radial machining surface 1016. This arrangement creates a "V" shaped peripheral or circumferential surface (comprising the leading circumferential machining surface 1012 and the trailing circumferential machining surface 1015), preferably having substantially equally angled peripheral surfaces 1012, 1015. A width of the outer peripheral surface 1012 and the inner peripheral surface 1015 can be substantially the same to one another or different from one another. The outer peripheral surface 1012 can be linear, as illustrated, arched such as the convex shaped, outer peripheral surface 912, or a combination thereof.

In certain instances, the bit forming tool can be shaped where an outer diameter 1031 of a leading side radial machining surface 1014 and an outer diameter 1037 of a trailing side radial machining surface 1016 are the same and the outer circumference 1017 of the bit forming tool 1000 defines an outer diameter 1031 of each of the leading side radial machining surface 1014 and the trailing side radial machining surface 1016. The bit forming tool is then angled appropriately to form the flute(s).

Figure 30:
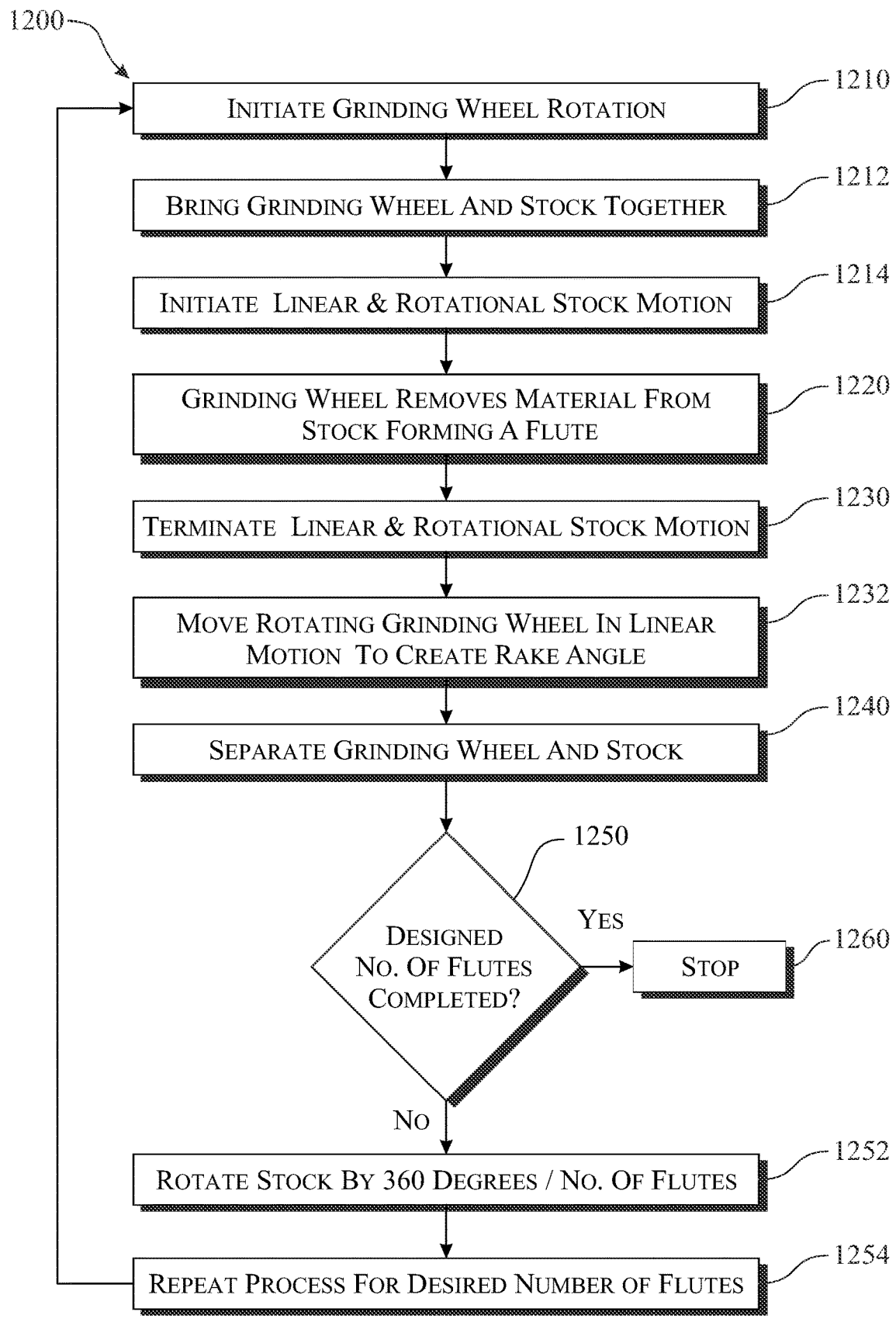
FIG. 30 presents an exemplary alternative constant rake fluted drill bit fabrication flow diagram.

The drill bit manufacturing flow diagram 1100 describes one method of fabricating the constant rake planar cutting edge fluted drill bit 700. The constant rake planar cutting edge fluted drill bit 700 can also be fabricating using the drill bit manufacturing flow diagram 1100 essentially in a reverse order of the steps, as described in a drill bit manufacturing flow diagram 1200 presented in FIG. 30. The drill bit manufacturing flow diagram 1200 begins by mounting the cylindrical drill bit blank 700A within the machine. Rotation of the bit forming tool 800, 900, 1000 is initiated (block 1210) while the bit forming tool 800, 900, 1000 is separated from the cylindrical drill bit blank 700A. The bit forming tool 800, 900, 1000 and the cylindrical drill stock blank bit 700A are brought together where the bit forming tool 800, 900, 1000 and the cylindrical drill bit blank 700A contact one another and the bit forming tool 800, 900, 1000 initiating machining of the cylindrical drill bit blank 700A. Approximately at the same time, rotation and a linear motion of the cylindrical drill bit blank 700A is initiating (block 1214). The orientation of the bit forming tool 800, 900, 1000 as well as the rotation and linear motion of the cylindrical drill bit blank 700A is determined by the designed helix angle ω of the constant rake planar cutting edge fluted drill bit 700. In a modified process, the bit forming tool 800, 900, 1000 can machine a slot into the cylindrical drill bit blank 700A to a depth that is approximate or at a final depth of cut 729. Upon reaching a desired depth of cut 729, the rotation and a linear motion of the cylindrical drill bit blank 700A can be initiated (block 1214). The bit forming tool 800, 900, 1000 removes material from the cylindrical drill bit blank 700A forming a respective flute formation 730, including a flute material collection surface 734 and a flute clearance surface 736. The difference between the two methods is the shape of the transition into the flute from the respective end of the drill bit shank section 714. The flute forming process continues until a leading cutting portion of the bit forming tool 800, 900, 1000 approaches the tip region of the cylindrical drill bit blank 700A. In this state, the linear and rotational motion of the cylindrical drill bit blank 700A would terminate (block 1230) and the bit forming tool 800, 900, 1000 would be adjusted in accordance with the desired design and the bit forming tool 800, 900, 1000 would continue removing material from the cylindrical drill bit blank 700A forming the flat rake surface (drill bit cutting face) 720 and the respective planar relief surface section 722 (block 1232). Upon completion of the forming of the flat rake surface (drill bit cutting face) 720 and the respective planar relief surface section 722, the machine separates the bit forming tool 800, 900, 1000 and the cylindrical drill bit blank 700A (block 1240). Upon completion of the first helical flute formation 730, a decision step determines if the desired number of flutes 730, 730n are formed in the conically shaped end stock blank 700B (decision block 1250). In a condition where the number of formed flutes 700, 700n is less than the desired number of flutes 730, 730n, the conically ended with first cutting edge formed and completed first helical flute formation stock 700G is rotated by an angle of 360 degrees/the desired number of flutes 730, 730n (block 1252). In the illustrated example, the constant rake planar cutting edge fluted drill bit 700 is designed to have two (2) flutes 730, 730n; therefore, the conically ended with first cutting edge formed and completed first helical flute formation stock 700G is rotated by an angle of 180 degrees and steps 1110 through 1130 are repeated (block 1254). The drill bit conically shaped end (pointed tip) 712 is formed either prior to the machining of the flutes 730 or following completion of the machining of the flutes 730 and the cutting surfaces 720, 722.

Upon completion of each subsequent nth flute formation 730n, the decision step determines if the desired number of flutes 730, 730n are formed in the conically shaped end stock blank 700B (decision block 1250). In a condition where the number of formed flutes 700, 700n is equal to the desired number of flutes 730, 730n, the process terminates (block 1260) and machining of the constant rake planar cutting edge fluted drill bit 700 is completed.

As mentioned above, the bit forming tool 800 and the bit forming tool 1000 are just exemplary, wherein the shape of the cutting edges creates the flat rake surface (drill bit cutting face) 720 and the planar relief surface section 722. The bit forming tool 800, the bit forming tool 900, the bit forming tool 1000, or any other suitable tool can be a grinding wheel, an abrasive grinding wheel, a super abrasive grinding tool, a cutting tool, or any other suitable tool for machining a blank into a drill bit. The selected type of wheel and respective cutting surface would be determined based upon a material selected for the drill bit 700.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

ELEMENT DESCRIPTION REFERENCES

Ref No. Description
- 100 twisted (helical) drill bit
- 110 twisted (helical) drill bit circumferential surface
- 112 drill stock conically shaped end
- 120 drill bit cutting edge
- 130 first helical flute formation
- 130n nth helical flute formation
- 131 flute leading edge
- 133 flute trailing edge
- 134 first flute material collection surface
- 134n nth flute material collection surface
- 136 first flute clearance surface
- 136n nth flute clearance surface
- 200 cutting tool
- 202 cutting tool body
- 203 cutting tool first face edge
- 204 cutting tool face
- 205 cutting tool second face edge
- 206 cutting tool flank
- 208 tool cutting edge
- 210 round stock material
- 212 stock material surface
- 214 shaped surface
- 218 removed chip
- 219 stock rotational axis
- 220 stock rotational motion
- 230 horizontal axis
- 239 normal reference
- 239' normal reference (representative of the axis of rotation of the drill bit)
- $\alpha 2$ relief (clearance) angle
- $\beta 2$ edge cutting angle
- $\theta 2$ rake angle
- $\phi$ second rake angle
- 300 cutting tool
- 302 cutting tool body
- 304 cutting tool face
- 306 cutting tool flank
- 308 tool cutting edge
- 310 round stock material
- 312 stock material surface
- 314 shaped surface
- 318 removed chip
- 319 stock rotational axis
- 320 stock rotational motion
- 330 horizontal axis
- 339 normal reference
- 339' normal reference (representative of the axis of rotation of the drill bit)
- $\alpha 3$ relief (clearance) angle
- $\beta 3$ edge cutting angle
- $\theta 3$ rake angle
- 400 cutting tool
- 402 cutting tool body
- 404 cutting tool face
- 406 cutting tool flank
- 408 tool cutting edge
- 410 round stock material
- 412 stock material surface
- 414 shaped surface
- 418 removed chip
- 419 stock rotational axis
- 420 stock rotational motion
- 430 horizontal axis
- 439 normal reference
- 439' normal reference (representative of the axis of rotation of the drill bit)
- $\alpha 4$ relief (clearance) angle
- $\beta 4$ edge cutting angle
- $\theta 4$ rake angle
- 500 cutting tool
- 502 cutting tool body
- 504 cutting tool face
- 506 cutting tool flank
- 508 tool cutting edge
- 510 round stock material
- 512 stock material surface
- 514 shaped surface
- 518 removed chip
- 519 stock rotational axis
- 520 stock rotational motion
- 530 horizontal axis
- 539 normal reference
- 539' normal reference (representative of the axis of rotation of the drill bit)
- $\alpha 5$ relief (clearance) angle
- $\beta 5$ edge cutting angle
- $\theta 5$ first rake angle
- 600 cutting tool
- 602 cutting tool body
- 604 cutting tool face
- 606 cutting tool flank
- 608 tool cutting edge
- 610 round stock material
- 612 stock material surface 614 shaped surface
618 removed chip
619 stock rotational axis
620 stock rotational motion
630 horizontal axis
634 tool face angle
639 normal reference
639' normal reference (representative of the axis of rotation of the drill bit)
α6 relief (clearance) angle
β6 edge cutting angle
θ6 rake angle
700 constant rake planar cutting edge fluted drill bit
700A cylindrical drill bit blank
700B conically shaped end stock blank
700C conically ended with cutting edge formed stock
700D conically ended with first cutting edge formed and first helical flute formation initiated stock
700E conically ended with first cutting edge formed and first helical flute formation continued stock
700F conically ended with first cutting edge formed and first helical flute formation nearing completion stock
700G conically ended with first cutting edge formed and completed first helical flute formation stock
702 point/tip end
704 shank end
710 cylindrical drill stock residual circumferential surface
710A cylindrical drill stock blank circumferential surface
710B cylindrical drill stock blank circumferential surface
710C cylindrical drill stock residual circumferential surface
710D cylindrical drill stock residual circumferential surface
710E cylindrical drill stock residual circumferential surface
710F cylindrical drill stock residual circumferential surface
710G cylindrical drill stock residual circumferential surface
712 drill stock conically shaped end (pointed tip)
713 planar cutting surface demarcation
714 drill bit shank section
720 flat rake surface (drill bit cutting face)
721 bit cutting edge-flute demarcation
722 planar relief surface section
724 helical flute section
726 helical flute section shank end
728 helical flute section leading end
729 depth of flute cut
730 first helical flute formation
730n nth helical flute formation
732 first helical flute crease
732n nth helical flute crease
734 first helical flute material collection surface
734n nth helical flute material collection surface
736 first helical flute clearance surface
736n nth helical flute clearance surface
740 bit material linear motion
742 bit rotational indexing marker
744 bit rotational index
749 bit material rotational motion
800 bit forming tool
810 bit forming tool machining wheel
811 first peripheral edge
812 leading, linear circumferential machining surface
813 second peripheral edge
814 leading side radial machining surface
816 trailing side radial machining surface
820 bit forming tool arbor
822 bit forming tool arbor fillet
829 bit forming tool rotational motion
830 bit stock elongated axis
831 first peripheral edge diameter
833 second peripheral edge diameter
839 bit forming tool rotational axis
899 bit forming tool linear motion
900 bit forming tool
910 bit forming tool machining wheel
911 first peripheral edge
912 leading, convex circumferential machining surface
913 second peripheral edge
914 leading side radial machining surface
916 trailing side radial machining surface
920 bit forming tool arbor
922 bit forming tool arbor fillet
931 first peripheral edge diameter
933 second peripheral edge diameter
1000 bit forming tool
1010 bit forming tool machining wheel
1011 first peripheral edge
1012 leading circumferential machining surface
1013 second peripheral edge
1014 leading side radial machining surface
1015 trailing circumferential machining surface
1016 trailing side radial machining surface
1017 central peripheral edge (outer diameter)
1020 bit forming tool arbor
1022 bit forming tool arbor fillet
1031 first peripheral edge diameter
1033 second peripheral edge diameter
1037 central peripheral edge (larger) diameter
1100 drill bit manufacturing flow diagram
1110 drill bit stock mounted and stock remains stationary
1112 initiate grinding tool rotation
1114 bring grinding tool and stock together
1120 grinding wheel removes material from stock forming cutting edge
1122 initiate linear motion of stock
1124 initiate rotational motion of stock
1126 material removal forming a flute; stops at shank location
1130 designed number of flutes formed decision step
1132 rotate stock by 360 degrees divided by number of flutes
1134 repeat process for number of desired flutes
1140 end machining process
1200 drill bit manufacturing flow diagram
1210 initiate grinding tool rotation
1212 bring grinding tool and stock together
1214 initiate linear and rotational motion of stock
1220 grinding wheel removes material from stock forming a flute
1230 terminate linear and rotational motion of stock
1232 move rotating grinding wheel in a linear motion to create rake angle
1240 separate grinding tool and stock from one another
1250 designed number of flutes formed decision step
1252 rotate stock by 360 degrees divided by number of flutes
1254 repeat process for number of desired flutes
1260 end machining process
D drill stock blank diameter
L1 drill stock blank length
L2 cylindrical length of conically ended stock blank L3 bit shank cylindrical length
R cutting edge radius
λ lead angle
ω helix angle
ω1 rake angle
Ψ tip angle
ψ1 effective tip angle
σ1 bit forming tool reference angle

What is claimed is:

1. A method of fabricating a drill bit, the method comprising steps of:
   (a) securing a drill bit blank stock in a machine;
   (b) initiating a rotation of a machining wheel;
   (c) a drawing together motion bringing at least one of the rotating machining wheel and the drill bit blank stock towards the other of the rotating machining wheel and the drill bit blank stock at a location proximate a drill bit shank section of the drill bit blank stock, the drawing together motion being in a direction generally perpendicular to a longitudinal axis of the drill bit blank stock;
   (d) initiating a linear motion and a rotational motion of the drill bit blank stock to cut a helical flute when the rotating machining wheel is prior to or at a depth of cut of the helical flute, wherein the linear motion and the rotational motion are performed simultaneously during the process of cutting the helical flute;
   (e) removing material from the drill bit blank stock using the rotating machining wheel, while the drill bit blank stock remains moving in the combined simultaneous linear and rotational motion to create the helical flute from a shank sided end of a cylindrical helical flute section to a free end of the cylindrical helical flute section, wherein step (e) transitions the drill bit blank stock into a partially completed drill bit,
   (f) ceasing the rotational motion of the partially completed drill bit when a distal radial edge of the rotating machining wheel reaches a position proximate a leading end of the partially completed drill bit,
   (g) ceasing the linear motion of the partially completed drill bit and radially separating the rotating machining wheel and the partially completed drill bit from one another, the radially separating motion being in a direction generally perpendicular to the longitudinal axis of the partially completed drill bit and in a direction opposite to the drawing together motion, wherein step (g) transitions the partially completed drill bit into a formed drill bit;
   wherein step (g) creates a flat rake surface, wherein the flat rake surface extends axially between the free end of the cylindrical helical flute section created in step (e) and the leading end of the partially completed drill bit, the flat rake surface extending radially outward from a crease of the helical flute to a circumferential surface of the partially completed drill bit.

2. The method of fabricating a drill bit as recited in claim 1, the method further comprising a step of:
   (h) continuing with the linear motion of the drill bit stock while continuing to remove material from the drill bit stock using the rotating machining wheel,
   wherein step (h) occurs between step (f) and step (g),
   wherein a combination of steps (g) and (h) create the flat rake surface.

3. The method of fabricating a drill bit as recited in claim 1, the method further comprising a step of:
   (h) forming a pointed tip at the leading end of the drill bit blank stock.

4. The method of fabricating a drill bit as recited in claim 1, the method further comprising a step of:
   (h) forming a pointed tip at the leading end of the drill bit blank stock, wherein the pointed tip extends between the leading end of the drill bit blank stock and a demarcation defining an intersection formed between the flat rake surface and the free end of the cylindrical helical flute section.

5. The method of fabricating a drill bit as recited in claim 1, the method further comprising a step of:
   (h) establishing a total predetermined number of helical flutes;
   (i) repeatably processing steps (j) and (k) until the number of helical flutes machined in the drill bit blank stock equals the total predetermined number of helical flutes;
   (j) rotating the drill bit blank stock by an angle of 360/total predetermined number of helical flutes;
   (k) repeating steps (c) through (g); and
   (l) terminating the machining of the drill bit in a condition where the number of helical flutes machined in the drill bit blank stock is equal to the total predetermined number of helical flutes.

6. The method of fabricating a drill bit as recited in claim 1, the method further comprising a step of:
   (m) aligning a radially distant edge of a machining surface of the rotating machining wheel to cut through a distal end of the drill bit blank stock.

7. The method of fabricating a drill bit as recited in claim 1, the rate of the rotation motion of the drill bit blank stock and the rate of the axial motion of the drill bit blank stock respective to the machining wheel during step (e) creates a helix angle that is one of:
   between 20 and 30 degrees when the drill bit is designated for general use,
   between 30 and 80 degrees when the drill bit is designated for use in drilling deep holes or holes into softer materials, or
   greater than zero and less than 45 degrees when the drill bit is designated for use in drilling holes into harder or stronger materials.

8. The method of fabricating a drill bit as recited in claim 1, wherein the rotational motion of the drill bit blank stock initiated in step (d) and during step (e) is one of:
   counterclockwise to generate a right hand twist drill bit, or
   clockwise to generate a left hand twist drill bit.

9. The method of fabricating a drill bit as recited in claim 1, wherein the machining wheel having a machining surface, wherein the machining surface creates at least one of the helical flute and the flat rake surface, wherein the machining surface is shaped in accordance with one of:
   a first radial surface having a first diameter, a second radial surface having a second diameter, and a circumferential surface therebetween, wherein the first diameter is smaller than the second diameter, wherein the machining surface includes at least one of the circumferential surface and the second radial surface,
   a first radial surface having a first diameter, a second radial surface having a second diameter, and a circumferential surface therebetween, wherein the first diameter is smaller than the second diameter, wherein a difference between the first diameter and the second diameter is greater than the depth of cut of the helical flute, wherein the machining surface includes at least one of the circumferential surface and the second radial surface, a circumferential surface extending between a maximum outer circumferential edge and an inner circumferential edge, wherein a distance between the maximum outer circumferential edge and the inner circumferential edge is equal to or greater than the depth of cut of the helical flute, wherein the machining surface includes the circumferential surface, a circumferential surface extending as a conical frustum shape between a maximum outer circumferential edge and an inner circumferential edge, wherein a distance between the maximum outer circumferential edge and the inner circumferential edge is equal to or greater than the depth of cut of the flute, wherein the machining surface includes the circumferential surface, or a circumferential surface comprising a pair of opposing conical frustum shape surfaces extending between a centrally located maximum outer circumferential edge and each of a first outer circumferential edge of the first conical frustum shape surface of the pair of opposing conical frustum shape surfaces and a second inner circumferential edge of the second conical frustum shape surface of the pair of opposing conical frustum shape surfaces, wherein the first conical frustum shape surface and a first radial surface intersect along the first outer circumferential edge and the second conical frustum shape surface and a second radial surface intersect along the second outer circumferential edge, wherein the machining surface includes at least one of the pair of opposing conical frustum shape surfaces and the second radial surface.

10. A method of fabricating a drill bit, the method comprising steps of:
(a) securing a drill bit blank stock in a machine;
(b) initiating a rotation of a machining wheel;
(c) a drawing together motion bringing at least one of the rotating machining wheel and the drill bit blank stock towards the other of the rotating machining wheel and the drill bit blank stock at a location proximate a drill bit shank section of the drill bit blank stock, the drawing together motion being in a direction generally perpendicular to a longitudinal axis of the drill bit blank stock;
(d) initiating a linear motion and a rotational motion of the drill bit blank stock to cut a helical flute when the rotating machining wheel is prior to or at a depth of cut of the helical flute, wherein the linear motion and the rotational motion are performed simultaneously during the process of cutting the helical flute;
(d) initiating a linear motion and a rotational motion of the drill bit blank stock to cut a helical flute when the rotating machining wheel is prior to or at a depth of cut of the helical flute wherein the linear motion and the rotational motion are performed simultaneously during the process of cutting the helical flute;
(e) removing material from the drill bit blank stock using the rotating machining wheel, while the drill bit blank stock remains moving in the combined simultaneous linear and rotational motion to create the helical flute from a shank sided end of a cylindrical helical flute section to a free end of the cylindrical helical flute section, wherein step (e) transitions the drill bit blank stock into a partially completed drill bit,
(f) ceasing the rotational motion of the partially completed drill bit when a distal radial edge of the rotating machining wheel reaches a position proximate a leading end of the partially completed drill bit,
(g) ceasing the linear motion of the partially completed drill bit and radially separating the rotating machining wheel and the partially completed drill bit from one another, the radially separating motion being in a direction generally perpendicular to the longitudinal axis of the partially completed drill bit and in a direction opposite to the drawing together motion, wherein step (g) transitions the partially completed drill bit into a formed drill bit;

wherein step (g) creates a flat rake surface, wherein the flat rake surface extends axially between the free end of the cylindrical helical flute section created in step (e) and the leading end of the partially completed drill bit, the flat rake surface extending radially outward from a crease of the helical flute to a circumferential surface of the partially completed drill bit, wherein the machining wheel is one of:
a grinding wheel, or
a cutting wheel.

11. The method of fabricating a drill bit as recited in claim 10, the method further comprising a step of:
(h) continuing with the linear motion of the drill bit stock while continuing to remove material from the drill bit stock using the rotating machining wheel,
wherein step (h) occurs between step (f) and step (g),
wherein a combination of steps (g) and (h) create the flat rake surface.

12. The method of fabricating a drill bit as recited in claim 10, the method further comprising a step of:
(h) forming a pointed tip at the leading end of the drill bit blank stock.

13. The method of fabricating a drill bit as recited in claim 10, the method further comprising a step of:
(h) forming a pointed tip at the leading end of the drill bit blank stock, wherein the pointed tip extends between the leading end of the drill bit blank stock and a demarcation defining an intersection formed between the flat rake surface and the free end of the cylindrical helical flute section.

14. The method of fabricating a drill bit as recited in claim 10, the method further comprising a step of:
(h) establishing a total predetermined number of helical flutes;
(i) repeatably processing steps (j) and (k) until the number of helical flutes machined in the drill bit blank stock equals the total predetermined number of helical flutes;
(j) rotating the drill bit blank stock by an angle of 360/total predetermined number of helical flutes;
(k) repeating steps (c) through (g); and
(l) terminating the machining of the drill bit in a condition where the number of helical flutes machined in the drill bit blank stock is equal to the total predetermined number of helical flutes.

15. The method of fabricating a drill bit as recited in claim 10, wherein the rate of the rotation motion of the drill bit blank stock and the rate of the axial motion of the drill bit blank stock respective to the machining wheel during step (e) creates a helix angle that is one of:
between 20 and 30 degrees when the drill bit is designated for general use,
between 30 and 80 degrees when the drill bit is designated for use in drilling deep holes or holes into softer materials, or
greater than zero and less than 45 degrees when the drill bit is designated for use in drilling holes into harder or stronger materials.

16. The method of fabricating a drill bit as recited in claim 10, wherein the rotational motion of the drill bit blank stock initiated in step (d) and during step (e) is one of:
  counterclockwise to generate a right hand twist drill bit, or
  clockwise to generate a left hand twist drill bit.

17. The method of fabricating a drill bit as recited in claim 10, wherein the machining wheel having a machining surface, wherein the machining surface creates at least one of the helical flute and the flat rake surface, wherein the machining surface is shaped in accordance with one of:
  a first radial surface having a first diameter, a second radial surface having a second diameter, and a circumferential surface therebetween, wherein the first diameter is smaller than the second diameter, wherein the machining surface includes at least one of the circumferential surface and the second radial surface,
  a first radial surface having a first diameter, a second radial surface having a second diameter, and a circumferential surface therebetween, wherein the first diameter is smaller than the second diameter, wherein a difference between the first diameter and the second diameter is greater than the depth of cut of the helical flute, wherein the machining surface includes at least one of the circumferential surface and the second radial surface,
  a circumferential surface extending between a maximum outer circumferential edge and an inner circumferential edge, wherein a distance between the maximum outer circumferential edge and the inner circumferential edge is equal to or greater than the depth of cut of the helical flute, wherein the machining surface includes the circumferential surface,
  a circumferential surface extending as a conical frustum shape between a maximum outer circumferential edge and an inner circumferential edge, wherein a distance between the maximum outer circumferential edge and the inner circumferential edge is equal to or greater than the depth of cut of the flute, wherein the machining surface includes the circumferential surface, or
  a circumferential surface comprising a pair of opposing conical frustum shape surfaces extending between a centrally located maximum outer circumferential edge and each of a first outer circumferential edge of the first conical frustum shape surface of the pair of opposing conical frustum shape surfaces and a second inner circumferential edge of the second conical frustum shape surface of the pair of opposing conical frustum shape surfaces, wherein the first conical frustum shape surface and a first radial surface intersect along the first outer circumferential edge and the second conical frustum shape surface and a second radial surface intersect along the second outer circumferential edge, wherein the machining surface includes at least one of the pair of opposing conical frustum shape surfaces and the second radial surface.

18. A method of fabricating a drill bit, the method comprising steps of:
  (a) securing a drill bit blank stock in a machine;
  (b) initiating a rotation of a machining wheel;
  (c) a drawing together motion bringing at least one of the rotating machining wheel and the drill bit blank stock towards the other of the rotating machining wheel and the drill bit blank stock at a location proximate a drill bit shank section of the drill bit blank stock, the drawing together motion being in a direction generally perpendicular to a longitudinal axis of the drill bit blank stock;
  (d) initiating a linear and a rotational motion of the drill bit blank stock to cut a helical flute when the rotating machining wheel is prior to or at a depth of cut of the helical flute, wherein the linear motion and the rotational motion are performed simultaneously during the process of cutting the helical flute;
  (e) removing material from the drill bit blank stock using the rotating machining wheel, while the drill bit blank stock remains moving in the combined simultaneous linear and rotational motion to create the helical flute from a shank sided end of a cylindrical helical flute section to a free end of the cylindrical helical flute section, wherein step (e) transitions the drill bit blank stock into a partially completed drill bit,
  (f) ceasing the rotational motion of the partially completed drill bit when a distal radial edge of the rotating machining wheel reaches a position proximate a leading end of the partially completed drill bit,
  (g) ceasing the linear motion of the partially completed drill bit and radially separating the rotating machining wheel and the partially completed drill bit from one another, the radially separating motion being in a direction generally perpendicular to the longitudinal axis of the partially completed drill bit and in a direction opposite to the drawing together motion, wherein step (g) transitions the partially completed drill bit into a formed drill bit;
  wherein step (g) creates a flat rake surface, wherein the flat rake surface extends axially between the free end of the cylindrical helical flute section created in step (e) and the leading end of the partially completed drill bit, the flat rake surface extending radially outward from a crease of the helical flute to a circumferential surface of the partially completed drill bit,
  wherein the machining wheel includes one of:
  a leading side radial machining surface and a linear chamfered circumferential machining surface intersect along a first edge therebetween and a trailing side radial machining surface and the linear chamfered circumferential machining surface intersect along a second edge therebetween, wherein a diameter of the first edge is smaller than a diameter of the second edge, wherein the trailing side radial machining surface creates the flat rake surface,
  a leading side radial machining surface and a convex chamfered circumferential machining surface intersect along a first edge (therebetween and a trailing side radial machining surface and the linear chamfered circumferential machining surface intersect along a second edge therebetween, wherein the trailing side radial machining surface creates the flat rake surface, or
  a leading side radial machining surface and a leading circumferential machining surface of a V-shaped circumferential surface intersect along a first edge of the chamfered circumferential surface, a trailing side radial machining surface of the V-shaped circumferential surface and a trailing side radial machining surface intersect along a second edge therebetween, leading circumferential machining surface of the V-shaped circumferential surface and the trailing side radial machining surface the V-shaped circumferential surface intersect along a central edge therebetween wherein a diameter of the central edge is larger than each of a diameter of the first outer edge of the V-shaped circumferential surface and a diameter of the second edge of the V-shaped circumferential surface, wherein the trailing side radial machining surface creates the flat rake surface.

19. The method of fabricating a drill bit as recited in claim 18, the method further comprising a step of:
   (h) continuing with the linear motion of the drill bit stock while continuing to remove material from the drill bit using the rotating machining wheel,
   wherein step (h) occurs between step (f) and step (g),
   wherein a combination of steps (g) and (h) create the flat rake surface.

20. The method of fabricating a drill bit as recited in claim 18, the method further comprising a step of:
   (h) forming a pointed tip at the leading end of the drill bit blank stock.

21. The method of fabricating a drill bit as recited in claim 18, the method further comprising a step of:
   (h) forming a pointed tip at the leading end of the drill bit blank stock, wherein the pointed tip extends between the leading end of the drill bit blank stock and a demarcation defining an intersection formed between the flat rake surface and the free end of the cylindrical helical flute section.

22. The method of fabricating a drill bit as recited in claim 18, the method further comprising a step of:
   (h) establishing a total predetermined number of helical flutes;
   (i) repeatably processing steps (j) and (k) until the number of helical flutes machined in the drill bit blank stock equals the total predetermined number of helical flutes;
   (j) rotating the drill bit blank stock by an angle of 360/total predetermined number of helical flutes;
   (k) repeating steps (c) through (g); and
   (l) terminating the machining of the drill bit in a condition where the number of helical flutes machined in the drill bit blank stock is equal to the total predetermined number of helical flutes.

23. The method of fabricating a drill bit as recited in claim 18, wherein the rate of the rotation motion of the drill bit blank stock and the rate of the axial motion of the drill bit blank stock respective to the machining wheel during step (e) creates a helix angle that is one of:
   between 20 and 30 degrees when the drill bit is designated for general use,
   between 30 and 80 degrees when the drill bit is designated for use in drilling deep holes or holes into softer materials, or
   greater than zero and less than 45 degrees when the drill bit is designated for use in drilling holes into harder or stronger materials.

24. The method of fabricating a drill bit as recited in claim 18, wherein the rotational motion of the drill bit blank stock initiated in step (d) and during step (e) is one of:
   counterclockwise to generate a right hand twist drill bit, or
   clockwise to generate a left hand twist drill bit.

* * * * *